US012259949B2

United States Patent
Hieida et al.

(10) Patent No.: US 12,259,949 B2
(45) Date of Patent: Mar. 25, 2025

(54) INFORMATION PROCESSING DEVICE, INFORMATION PROCESSING METHOD, AND PROGRAM

(71) Applicant: Sony Group Corporation, Tokyo (JP)

(72) Inventors: Yusuke Hieida, Chiba (JP); Suguru Aoki, Tokyo (JP); Yuki Yamamoto, Chiba (JP)

(73) Assignee: Sony Group Corporation, Tokyo (JP)

( * ) Notice: Subject to any disclaimer, the term of this patent is extended or adjusted under 35 U.S.C. 154(b) by 414 days.

(21) Appl. No.: 17/635,680

(22) PCT Filed: Aug. 11, 2020

(86) PCT No.: PCT/JP2020/030558
§ 371 (c)(1),
(2) Date: Feb. 15, 2022

(87) PCT Pub. No.: WO2021/033591
PCT Pub. Date: Feb. 25, 2021

(65) Prior Publication Data
US 2022/0292296 A1     Sep. 15, 2022

(30) Foreign Application Priority Data
Aug. 22, 2019   (JP) .................................. 2019-151756

(51) Int. Cl.
*G06F 18/25*     (2023.01)
*G01S 7/41*      (2006.01)
(Continued)

(52) U.S. Cl.
CPC ............ *G06F 18/253* (2023.01); *G01S 7/412* (2013.01); *G01S 13/42* (2013.01); *G01S 13/865* (2013.01)

(58) Field of Classification Search
CPC ......... G06F 18/253; G06F 7/412; G06F 13/42
See application file for complete search history.

(56) References Cited

U.S. PATENT DOCUMENTS

2019/0147245 A1   5/2019   Qi et al.
2019/0310348 A1   10/2019  Yamao

FOREIGN PATENT DOCUMENTS

JP   2007-188354 A   7/2007
JP   2017-166846 A   9/2017
(Continued)

OTHER PUBLICATIONS

International Search Report and English translation thereof mailed Oct. 13, 2020 in connection with International Application No. PCT/JP2020/030558.
(Continued)

*Primary Examiner* — Lam S Nguyen
(74) *Attorney, Agent, or Firm* — Wolf, Greenfield & Sacks, P.C.

(57) ABSTRACT

The present disclosure relates to an information processing device, an information processing method, and a program for improving object recognition accuracy.

A feature amount obtained by a point cloud that is a dense detection point of LiDAR or the like and a feature amount of a sparse detection point of a millimeter wave radar or the like within a predetermined distance are grouped and integrated with reference to the position of the feature amount of the dense detection point, the point cloud is restored using an integrated feature amount of the dense detection point, and object recognition processing such as semantic segmentation is performed. The present disclosure can be applied to a mobile body.

18 Claims, 15 Drawing Sheets

(51) Int. Cl.
*G01S 13/42* (2006.01)
*G01S 13/86* (2006.01)

(56) References Cited

FOREIGN PATENT DOCUMENTS

| | | |
|---|---|---|
| JP | 2019-016161 A | 1/2019 |
| WO | 2018/131163 A1 | 7/2018 |

OTHER PUBLICATIONS

Masuda et al., Automatic Extraction of Roadside Features Using Point-Clouds and Images Captured by Mobile Mapping Systems. Image Laboratory, vol. 30, No. 8. Aug. 5, 2019. pp. 42-47.
Qi et al., PointNet++: Deep Hierarchical Feature Learning on Point Sets in a Metric Space. 31st Conference on Neural Information Processing Systems, Dec. 2017. 10 pages. http://dl.acm.org/doi/10.5555/3295222.3295263.
Wang et al., MCF3D: Multi-Stage Complementary Fusion for Multi-Sensor 3D Object Detection. IEEE Access, vol. 7, pp. 90801-814, Jul. 24, 2019. doi: 10.1109/ACCESS.2019.2927012.

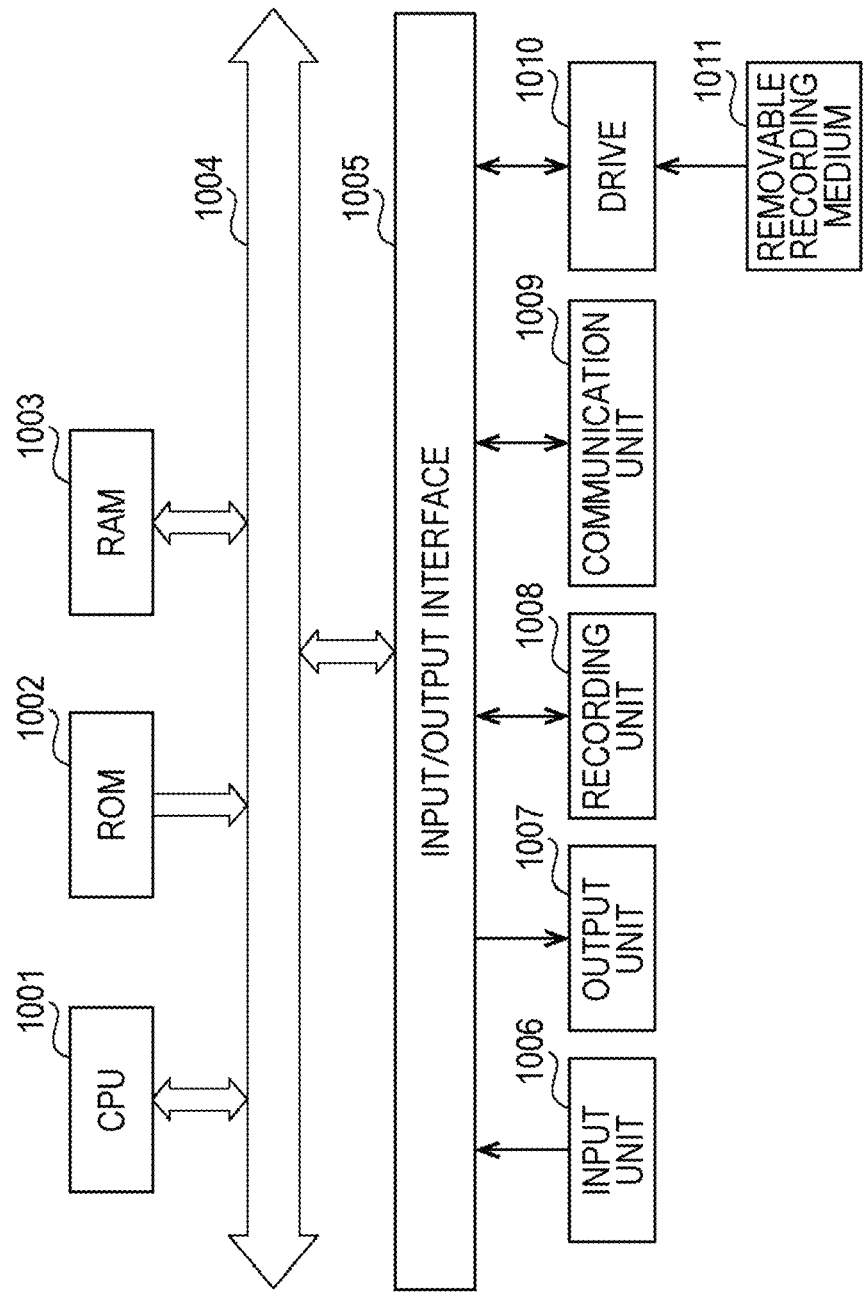

INFORMATION PROCESSING DEVICE, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/030558, filed in the Japanese Patent Office as a Receiving Office on Aug. 11, 2020, which claims priority to Japanese Patent Application Number 2019-151756, filed in the Japanese Patent Office on Aug. 22, 2019, each of which is hereby incorporated by reference in its entirety.

TECHNICAL FIELD

The present disclosure relates to an information processing device, an information processing method, and a program, and more particularly to an information processing device, an information processing method, and a program for improving object recognition accuracy.

BACKGROUND ART

A technique of sensing surroundings of a vehicle by various sensors such as a millimeter wave radar, a stereo camera, and light detection and ranging or laser imaging detection and ranging (LiDAR) mounted on the vehicle, and improving recognition accuracy for an object around the vehicle by combining sensing results has been proposed.

However, there is a case where the recognition accuracy for an object cannot be improved only by simply combining the sensing results of the plurality of sensors mounted on the vehicle.

For example, even if a sensing result of a sensor that returns a sparse detection result such as a millimeter wave radar and a sensing result including a dense three-dimensional point cloud calculated from LiDAR or a stereo camera are simply integrated, the recognition accuracy may not be able to be improved.

Therefore, it has been conceived to apply a technique for improving processing accuracy for a specific object by processing an image captured for use in another processing as well (see Patent Document 1).

CITATION LIST

Patent Document

Patent Document 1: Japanese Patent Application Laid-Open No. 2019-016161

SUMMARY OF THE INVENTION

Problems to be Solved by the Invention

However, even in the case of applying the technique according to Patent Document 1 and using the image captured for use in another processing, there is a possibility that recognition results of the plurality of sensors contradict each other.

The present disclosure has been made in view of such a situation, and in particular improves the recognition accuracy for an object by recognizing the object by appropriately integrating a dense sensing result and a sparse sensing result among sensing results by a plurality of sensors of a vehicle.

Solutions to Problems

An information processing device and a program according to one aspect of the present disclosure are an information processing device and a program including: a first acquisition unit configured to acquire a first feature amount that is a feature amount of a detection point detected by a first sensor; a second acquisition unit configured to acquire a second feature amount that is a feature amount of a detection point detected by a second sensor; and an integrated feature amount calculation unit configured to calculate an integrated feature amount obtained by integrating the first feature amount and the second feature amount on the basis of a relative distance between the respective detection points of the first feature amount and the second feature amount.

An information processing method according to one aspect of the present disclosure is an information processing method of an information processing device including a first acquisition unit, a second acquisition unit, and an integrated feature amount calculation unit, the information processing method including the steps of: by first acquisition unit, acquiring a first feature amount that is a feature amount of a detection point detected by a first sensor; by the second acquisition unit, acquiring a second feature amount that is a feature amount of a detection point detected by a second sensor; and by the integrated feature amount calculation unit, calculating an integrated feature amount obtained by integrating the first feature amount and the second feature amount on the basis of a relative distance between the respective detection points of the first feature amount and the second feature amount.

In one aspect of the present disclosure, a first feature amount that is a feature amount of a detection point detected by a first sensor is acquired, a second feature amount that is a feature amount of a detection point detected by a second sensor is acquired; and an integrated feature amount obtained by integrating the first feature amount and the second feature amount is calculated on the basis of a relative distance between the respective detection points of the first feature amount and the second feature amount.

BRIEF DESCRIPTION OF DRAWINGS

FIG. 15 is a diagram illustrating a configuration example of a general-purpose computer.

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Hereinafter, modes for carrying out the present technology will be described. Description will be given in the following order.

1. Outline of Present Disclosure
2. First Embodiment
3. Second Embodiment
4. Example of Executed by Software 1. Outline of Present Disclosure The present disclosure appropriately integrates a sparse sensing result and a dense sensing result among sensing results from a plurality of sensors of a vehicle and recognizes an object, thereby improving object recognition accuracy.

First, an outline of an object recognition unit of the present disclosure will be described with reference to FIG. 1.

Figure 1:
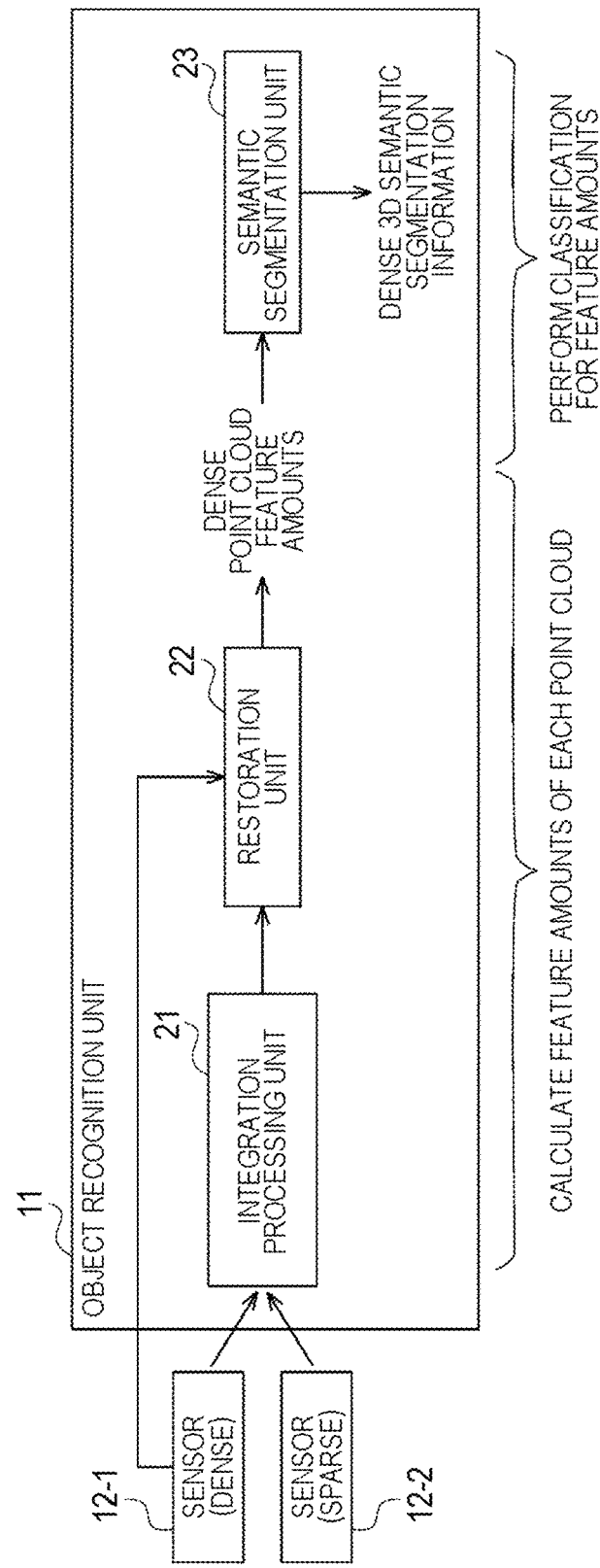
FIG. 1 is a diagram for describing an outline of the present disclosure.

An object recognition unit 11 in FIG. 1 recognizes an object on the basis of a sensing result obtained from a sensor 12-1 that can obtain a dense sensing result such as a stereo camera or LiDAR and a sensing result obtained from a sensor 12-2 that can obtain a sparse sensing result such as a millimeter wave radar, and outputs a recognition result as dense 3D semantic segmentation information. Note that the sparseness and denseness of the sensing results here may be not only spatial sparseness and denseness but also temporal sparseness and denseness, or may be a combination of both the spatial and temporal sparseness and denseness.

More specifically, the object recognition unit 11 includes an integration processing unit 21, a restoration unit 22, and a semantic segmentation unit 23.

The integration processing unit 21 integrates local feature amounts based on the sparse sensing result supplied from the sensor 12-2 such as a millimeter wave radar with local feature amounts based on the dense sensing result supplied from the sensor 12-1 such as a LiDAR with reference to the local feature amounts based on the dense sensing result, and outputs integrated feature amounts to the restoration unit 22.

The restoration unit 22 restores global feature amounts, which are feature amounts including a dense point cloud and is required in object recognition processing including semantic segmentation, on the basis of the local feature amounts supplied from the integration processing unit 21 and the dense sensing result supplied from the sensor 12-1 such as LiDAR, and outputs the global feature amounts to the semantic segmentation unit 23.

The semantic segmentation unit 23 performs the object recognition processing in units of points in the dense point cloud on the basis of the global feature amounts that are the feature amounts including the dense point cloud supplied from the restoration unit 22, and outputs dense 3D semantic segmentation information that is a recognition result.

That is, the integration processing unit 21 and the restoration unit 22 in the object recognition unit 11 function as a configuration for calculating feature amounts of each point cloud, and the semantic segmentation unit 23 functions as a configuration for performing classification (object recognition) of the feature amounts of each point cloud.

With the above configuration, by integrating the feature amounts based on the sparse sensing result with the feature amounts based on the dense sensing result with reference to the feature amounts based on the dense sensing result, the feature amounts based on the plurality of sensing results having different sparseness and denseness can be appropriately integrated, and the feature amount based on the dense sensing result can be obtained.

As a result, the object recognition processing using the dense feature amount in which the feature amounts based on the plurality of sensing results having different sparseness and denseness are appropriately integrated can be implemented, so that the recognition accuracy regarding the object recognition processing can be improved.

2. First Embodiment

<Configuration Example of Vehicle Control System>

Figure 2:
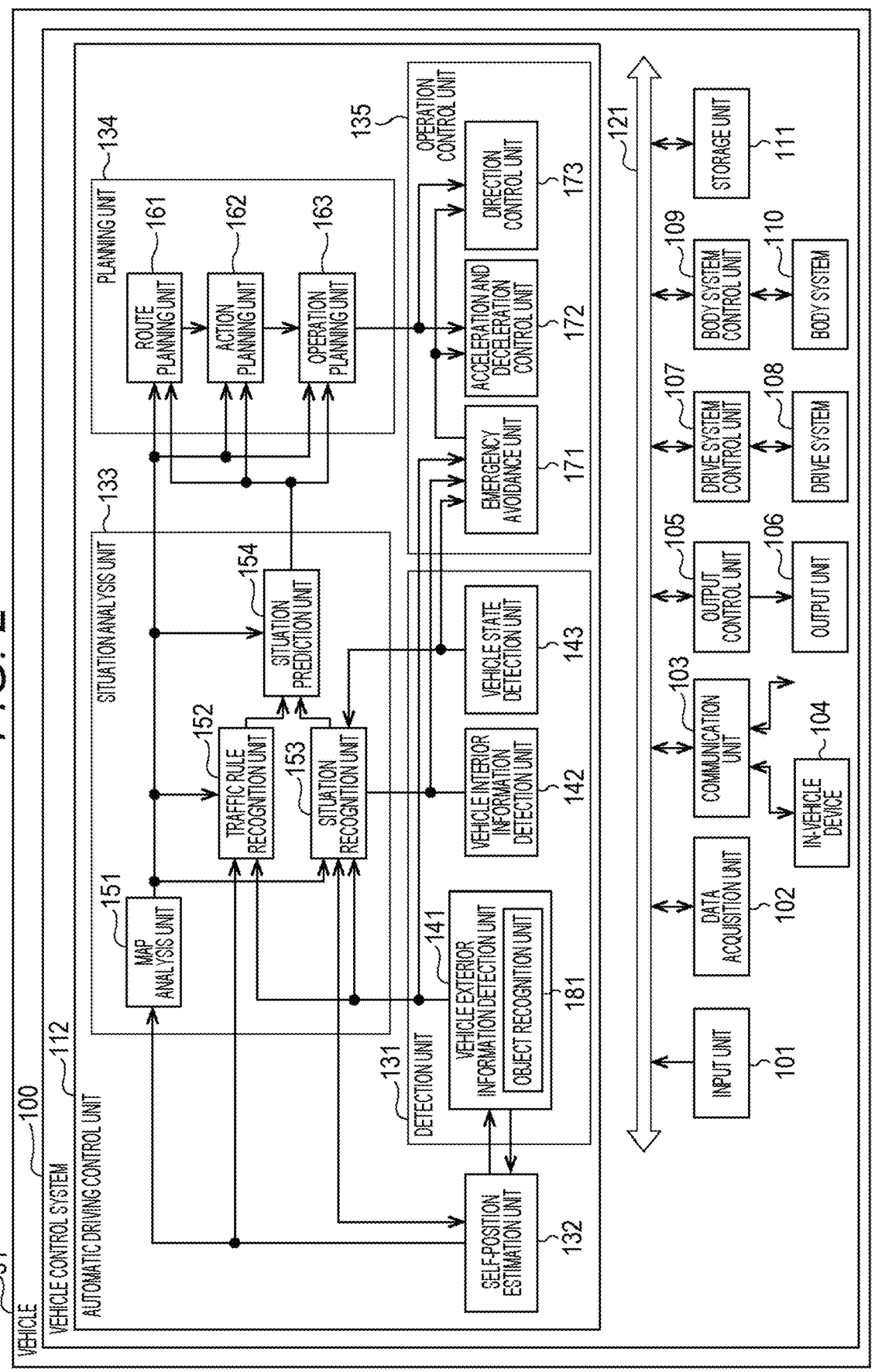
FIG. 2 is a diagram for describing a configuration example of a vehicle control system of the present disclosure.

FIG. 2 is a block diagram illustrating a schematic functional configuration example of a vehicle control system 100 of a vehicle 51 as an example of a mobile body control system of a vehicle to which the present technology according is applicable. The vehicle 51 in FIG. 2 corresponds to the vehicle 31 in FIG. 1.

Furthermore, hereinafter, in a case of distinguishing the vehicle provided with the vehicle control system 100 from other vehicles, the vehicle will be referred to as user's car or user's vehicle.

The vehicle control system 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an on-board communication network conforming to an arbitrary standard such as a controller area network (CAN), a local interconnect network (LIN), a local area network (LAN), or FlexRay (registered trademark), a bus, and the like. Note that the units of the vehicle control system 100 may be directly connected without the communication network 121.

Note that, hereinafter, the case where the units of the vehicle control system 100 perform communication via the communication network 121, the description of the communication network 121 is omitted. For example, the case where the input unit 101 and the automatic driving control unit 112 perform communication via the communication network 121 will be simply described as the input unit 101 and the automatic driving control unit 112 performing communication.

The input unit 101 includes a device used by a passenger to input various data, instructions, and the like. For example, the input unit 101 includes operation devices such as a touch panel, a button, a microphone, a switch, and a lever, an operation device capable of inputting data, instructions, and the like by a method other than a manual operation, such as voice or gesture, and the like. Furthermore, for example, the input unit 101 may be a remote control device using infrared rays or other radio waves, or an externally connected device such as a mobile device or a wearable device corresponding to the operation of the vehicle control system 100. The input unit 101 generates an input signal on the basis of the data, instructions, and the like input by the passenger, and supplies the input signal to each unit of the vehicle control system 100.

The data acquisition unit 102 includes various sensors and the like that acquire data to be used for the processing of the vehicle control system 100, and supplies the acquired data to each unit of the vehicle control system 100.

For example, the data acquisition unit 102 includes various sensors for detecting the state of the user's car and the like. Specifically, for example, the data acquisition unit 102 includes a gyro sensor, an acceleration sensor, an inertial measurement device (IMU), sensors for detecting an operation amount of an accelerator pedal, an operation amount of a brake pedal, a steering angle of a steering wheel, an engine speed, a motor speed, a rotation speed of wheels, or the like, and the like.

Furthermore, for example, the data acquisition unit 102 includes various sensors for detecting information outside the user's car. Specifically, for example, the data acquisition unit 102 includes imaging devices such as a time of flight (ToF) camera, a stereo camera, a monocular camera, an infrared camera, and other cameras. Furthermore, for example, the data acquisition unit 102 includes an environment sensor for detecting a weather, a meteorological phenomenon, or the like, and ambient information detection sensors for detecting an object around the user's car. The environment sensor includes, for example, a raindrop sensor, a fog sensor, a sunshine sensor, a snow sensor, and the like. The ambient information detection sensors include, for example, an ultrasonic sensor, a radar device, a light detection and ranging or laser imaging detection and ranging (LiDAR) device, a sonar, and the like.

Moreover, the data acquisition unit 102 includes, for example, various sensors for detecting a current position of the user's car. Specifically, for example, the data acquisition unit 102 includes a global navigation satellite system (GNSS) receiver that receives a GNSS signal from a GNSS satellite.

Furthermore, for example, the data acquisition unit 102 includes various sensors for detecting information inside the vehicle. Specifically, for example, the data acquisition unit 102 includes an imaging device that images a driver, a biosensor that detects biometric information of the driver, a microphone that collects sound in a vehicle interior, and the like. The biosensor is provided, for example, on a seating surface, a steering wheel, or the like, and detects the biometric information of a passenger sitting on a seat or the driver holding the steering wheel.

The communication unit 103 communicates with the in-vehicle device 104 and various devices outside the vehicle, a server, a base station, and the like, transmits data supplied from each unit of the vehicle control system 100, and supplies received data to each unit of the vehicle control system 100. Note that a communication protocol supported by the communication unit 103 is not especially limited, and the communication unit 103 can support a plurality of types of communication protocols.

For example, the communication unit 103 performs wireless communication with the in-vehicle device 104, using a wireless LAN, Bluetooth (registered trademark), near field communication (NFC), a wireless USB (WUSB), or the like. Furthermore, for example, the communication unit 103 performs wired communication with the in-vehicle device 104, using a universal serial bus (USB), a high-definition multimedia interface (HDMI, registered trademark), a mobile high-definition link (MHL), or the like via a connection terminal (not illustrated) (and a cable if necessary).

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal (for example, a terminal of a pedestrian or a shop, or a machine type communication (MTC) terminal) existing in the vicinity of the user's car, using a peer to peer (P2P) technology. Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon reception unit, and receives a radio wave or an electromagnetic wave transmitted from a wireless station or the like installed on a road, and acquires information such as a current position, congestion, traffic regulation, or required time.

The in-vehicle device 104 includes, for example, a mobile device or a wearable device of a passenger, an information device carried in or attached to the user's vehicle, a navigation device for searching for a route to an arbitrary destination, and the like.

The output control unit 105 controls output of various types of information to the passenger of the user's car or to the outside of the vehicle. The output control unit 105 controls output of visual information (for example, image data) and auditory information (for example, sound data) from the output unit 106 by generating an output signal including at least one of the visual information or the auditory information and supplying the output signal to the output unit 106, for example. Specifically, for example, the output control unit 105 synthesizes image data captured by different imaging devices of the data acquisition unit 102 to generate a bird's-eye view image, a panoramic image, or the like, and supplies an output signal including the generated image to the output unit 106. Furthermore, for example, the output control unit 105 generates sound data including a warning sound, a warning message, or the like for dangers of collision, contact, entry to a dangerous zone, or the like and supplies an output signal including the generated sound data to the output unit 106.

The output unit 106 includes a device capable of outputting the visual information or the auditory information to the passenger of the user's car or to the outside of the vehicle. For example, the output unit 106 includes a display device, an instrument panel, an audio speaker, headphones, a wearable device such as a glasses-type display worn by the passenger, a projector, a lamp, or the like. The display device included in the output unit 106 may be, for example, a head-up display, a transmission-type display, or a display for displaying the visual information in a field of view of the driver, such as a device having an augmented reality (AR) display function, in addition to a device having a normal display.

The drive system control unit 107 controls the drive system 108 by generating various control signals and supplying the control signals to the drive system 108. Furthermore, the drive system control unit 107 supplies a control signal to each unit other than the drive system 108 to issue notification of a control state of the drive system 108, or the like, as needed.

The drive system 108 includes various devices related to the drive system of the user's car. For example, the drive system 108 includes a drive force generation device for generating a drive force of an internal combustion engine or a drive motor, a drive force transmission mechanism for transmitting the drive force to the wheels, a steering mechanism for adjusting the steering angle, a braking device for generating a braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 and issues notification of a control state of the body system 110, or the like, as needed.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-precision map such as a dynamic map, a global map having less accuracy than the high-precision map but covering a large area, and a local map including information around the user's car.

The automatic driving control unit 112 performs control related to the automatic driving such as autonomous traveling or driving assist. Specifically, for example, the automatic driving control unit 112 performs cooperative control for the purpose of implementing an advanced driver assistance system (ADAS) function including collision avoidance or shock mitigation of the user's car, following travel based on a vehicular gap, vehicle speed maintaining travel, collision warning of the user's car, lane out warning of the user's car, and the like. Furthermore, for example, the automatic driving control unit 112 performs the cooperative control for the purpose of automatic driving and the like of autonomous travel without depending on an operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the user's car on the basis of data or signals from each unit of the vehicle control system 100. For example, the vehicle exterior information detection unit 141 performs detection processing, recognition processing, and tracking processing, for an object around the user's car, and processing of detecting a distance to the object. Objects to be detected include, for example, vehicles, people, obstacles, structures, roads, traffic lights, traffic signs, road markings, and the like. Furthermore, for example, the vehicle exterior information detection unit 141 performs processing of detecting an environment around the user's car. The surrounding environment to be detected includes, for example, weather, temperature, humidity, brightness, road surface condition, and the like. The vehicle exterior information detection unit 141 supplies data indicating results of the detection processing to the self-position estimation unit 132, a map analysis unit 151, a traffic rule recognition unit 152, and a situation recognition unit 153 of the situation analysis unit 133, and an emergency avoidance unit 171 and the like of the operation control unit 135.

The vehicle exterior information detection unit 141 further includes an object recognition unit 181.

The object recognition unit 181 has a configuration corresponding to the object recognition unit 41*a* in FIG. 1, performs object authentication processing on the basis of a point cloud (point cloud information) supplied from the ambient information detection sensors such as an ultrasonic sensor, a radar, a light detection and ranging or laser imaging detection and ranging (LiDAR), a stereo camera, and a sonar of the data acquisition unit 102, and authenticates an object in units of points of a point cloud around the user's car.

More specifically, the object recognition unit 181 performs object recognition processing for a plurality of sensing results having different sparseness and denseness supplied from the data acquisition unit 102 by using a deep neural network (DNN), for example, by a configuration to which PointNet++ is applied, and recognizes an object in units of points.

Note that the configuration of the object recognition unit 181 will be described in detail below.

The vehicle interior information detection unit 142 performs processing of detecting information inside the vehicle on the basis of data or signals from each unit of the vehicle control system 100. For example, the vehicle interior information detection unit 142 performs driver authentication processing and recognition processing, driver state detection processing, passenger detection processing, vehicle interior environment detection processing, and the like. The state of the driver to be detected includes, for example, a physical condition, an arousal level, a concentration level, a fatigue level, a line-of-sight direction, or the like. The environment in the vehicle to be detected includes, for example, temperature, humidity, brightness, odor, and the like. The vehicle interior information detection unit 142 supplies data indicating results of the detection processing to the situation recognition unit 153 of the situation analysis unit 133, the emergency avoidance unit 171 of the operation control unit 135, and the like.

The vehicle state detection unit 143 performs processing of detecting the state of the user's car on the basis of data or signals from each unit of the vehicle control system 100. The state of the user's car to be detected includes, for example, a speed, an acceleration, a steering angle, presence or absence of abnormality, content of abnormality, a state of driving operation, position and tilt of a power seat, a state of door lock, a state of another in-vehicle device, or the like. The vehicle state detection unit 143 supplies data indicating results of the detection processing to the situation recognition unit 153 of the situation analysis unit 133, the emergency avoidance unit 171 of the operation control unit 135, and the like.

The self-position estimation unit 132 performs processing of estimating the position, posture, and the like of the user's car on the basis of the data or signals from the units of the vehicle control system 100 such as the vehicle exterior information detection unit 141 and the situation recognition unit 153 of the situation analysis unit 133. Furthermore, the self-position estimation unit 132 generates a local map (hereinafter referred to as self-position estimation map) to be used for estimating the self-position, as needed. The self-position estimation map is a high-precision map using a technology such as simultaneous localization and mapping (SLAM), or the like. The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the user's car and its surroundings. The situation analysis unit 133 includes the map analysis unit 151, the traffic rule recognition unit 152, the situation recognition unit 153, and a situation prediction unit 154.

The map analysis unit 151 performs processing of analyzing various maps stored in the storage unit 111, using the data or signals from the units of the vehicle control system 100 such as the self-position estimation unit 132 and the vehicle exterior information detection unit 141, as needed, and builds a map including information necessary for automatic driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs processing of recognizing a traffic rule around the user's car on the basis of the data or signals from the units of the vehicle control system 100 such as the self-position estimation unit 132, the vehicle exterior information detection unit 141, and the map analysis unit 151. By the recognition processing, for example, the position and state of signals around the user's car, the content of traffic regulation around the user's car, a travelable lane, and the like are recognized. The traffic rule recognition unit 152 supplies data indicating a result of the recognition processing to the situation prediction unit 154 and the like.

The situation recognition unit 153 performs processing of recognizing the situation regarding the user's car on the basis of the data or signals from the units of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing a situation of the user's car, a situation around the user's car, a situation of the driver of the user's car, and the like. Furthermore, the situation recognition unit 153 generates a local map (hereinafter referred to as situation recognition map) used for recognizing the situation around the user's car, as needed. The situation recognition map is, for example, an occupancy grid map.

The situation of the user's car to be recognized includes, for example, the position, attitude, movement (for example, speed, acceleration, moving direction, and the like) of the user's car, and the presence or absence and content of abnormality, and the like. The situation around the user's car to be recognized includes, for example, types and positions of surrounding stationary objects, types of surrounding moving objects, positions and motions (for example, speed, acceleration, moving direction, and the like), configurations of surrounding roads and conditions of road surfaces, as well as surrounding weather, temperature, humidity, brightness, and the like. The state of the driver to be recognized includes, for example, physical condition, arousal level, concentration level, fatigue level, line-of-sight motion, traveling operation, and the like.

The situation recognition unit 153 supplies the data indicating a result of the recognition processing (including the situation recognition map, as needed) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the user's car on the basis of the data or signals from the units of the vehicle control system 100 such as the map analysis unit 151, the traffic rule recognition unit 152, and the situation recognition unit 153. For example, the situation prediction unit 154 performs processing of predicting the situation of the user's car, the situation around the user's car, the situation of the driver, and the like.

The situation of the user's car to be predicted includes, for example, a behavior of the user's car, occurrence of abnormality, a travelable distance, and the like. The situation around the user's car to be predicted includes, for example, a behavior of a moving object around the user's car, a change in a signal state, a change in the environment such as weather, and the like. The situation of the driver to be predicted includes, for example, a behavior and physical conditions of the driver, and the like.

The situation prediction unit 154 supplies data indicating a result of the prediction processing together with the data from the traffic rule recognition unit 152 and the situation recognition unit 153 to the route planning unit 161, the action planning unit 162, the operation planning unit 163 of the planning unit 134, and the like.

The route planning unit 161 plans a route to a destination on the basis of the data or signals from the units of the vehicle control system 100 such as the map analysis unit 151 and the situation prediction unit 154. For example, the route planning unit 161 sets a route to a destination specified from a current position on the basis of the global map. Furthermore, for example, the route planning unit 161 appropriately changes the route on the basis of situations of congestion, accidents, traffic regulations, construction, and the like, the physical conditions of the driver, and the like. The route planning unit 161 supplies data indicating the planned route to the action planning unit 162 and the like.

The action planning unit 162 plans an action of the user's car for safely traveling in the route planned by the route planning unit 161 within a planned time on the basis of the data or signals from the units of the vehicle control system 100 such as the map analysis unit 151 and the situation prediction unit 154. For example, the action planning unit 162 makes a plan of starting, stopping, traveling directions (for example, forward, backward, turning left, turning right, turning, and the like), driving lane, traveling speed, passing, and the like. The action planning unit 162 supplies data indicating the planned action of the user's car to the operation planning unit 163 and the like.

The operation planning unit 163 plans an operation of the user's car for implementing the action planned by the action planning unit 162 on the basis of the data or signals from the units of the vehicle control system 100 such as the map analysis unit 151 and the situation prediction unit 154. For example, the operation planning unit 163 plans acceleration, deceleration, a traveling track, and the like. The operation planning unit 163 supplies data indicating the planned operation of the user's car to an acceleration and deceleration control unit 172 and a direction control unit 173 of the operation control unit 135, and the like.

The operation control unit 135 controls the operation of the user's car. The operation control unit 135 includes the emergency avoidance unit 171, the acceleration and deceleration control unit 172, and the direction control unit 173.

The emergency avoidance unit 171 performs processing of detecting an emergency situation such as collision, contact, entry into a dangerous zone, driver's abnormality, vehicle's abnormality, and the like on the basis of the detection results of the vehicle exterior information detection unit 141, the vehicle interior information detection unit 142, and the vehicle state detection unit 143. In a case where the emergency avoidance unit 171 detects occurrence of the emergency situation, the emergency avoidance unit 171 plans the operation of the user's car for avoiding the emergency situation, such as sudden stop or sharp turn. The emergency avoidance unit 171 supplies data indicating the planned operation of the user's car to the acceleration and deceleration control unit 172, the direction control unit 173, and the like.

The acceleration and deceleration control unit 172 performs acceleration and deceleration for implementing the operation of the user's car planned by the operation planning unit 163 or the emergency avoidance unit 171. For example, the acceleration and deceleration control unit 172 calculates a control target value of a drive force generation device or a braking device for implementing the planned acceleration, deceleration, or sudden stop, and supplies a control command indicating the calculated control target value to the drive system control unit 107.

The direction control unit 173 controls a direction for implementing the operation of the user's car planned by the operation planning unit 163 or the emergency avoidance unit 171. For example, the direction control unit 173 calculates a control target value of a steering mechanism for implementing the traveling track or sharp turn planned by the operation planning unit 163 or the emergency avoidance unit 171, and supplies a control command indicating the calculated control target value to the drive system control unit 107.

<Configuration Example in Case Where Object Recognition Unit is Configured by PointNet++>

A configuration example in a case where the object recognition unit 181 is configured by PointNet++ itself will be described.

Here, the PointNet++ refers to a neural network that receives point cloud information as input and outputs a predetermined processing result on the basis of the input point cloud information.

Figure 3:
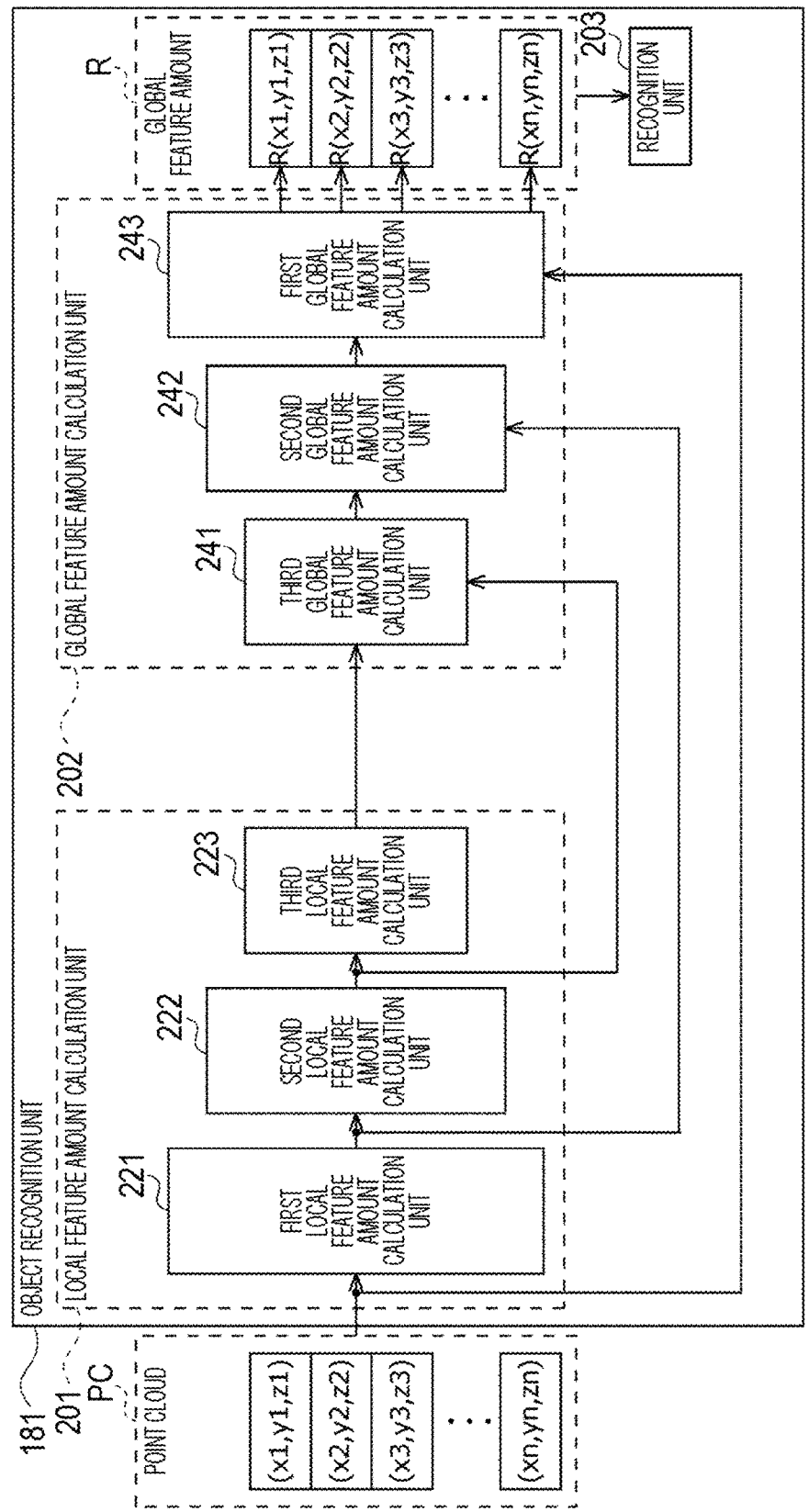
FIG. 3 is a block diagram for describing a configuration example in a case where an object recognition unit of the present disclosure is configured by PointNet++.

FIG. 3 is a diagram for describing a configuration example of the object recognition unit 181 configured by PointNet++.

The object recognition unit 181 obtains a global feature amount R on the basis of a point cloud PC supplied from the data acquisition unit 102 from a stereo camera or sensors such as LiDAR, and outputs a recognition result in units of points by the object recognition processing including semantic segmentation from the global feature amount R.

The point cloud PC is, for example, point cloud information including position information of each of a point (x1, y1, z1), a point (x2, y2, z2), a point (x3, y3, z3), . . . , and a point (xn, yn, zn).

Furthermore, the global feature amount R is a global feature amount R (x1, y1, z1), a global feature amount R (x2, y2, z2), a global feature amount R (x3, y3, z3), . . . , and a global feature amount R (xn, yn, zn) corresponding to (x1, y1, z1), (x2, y2, z2), and (x3, y3, z3), and is a global feature amount in units of points.

More specifically, the object recognition unit 181 in FIG. 3 includes a local feature amount calculation unit 201, a global feature amount calculation unit 202, and a recognition unit 203.

The local feature amount calculation unit 201 calculates local feature amounts for each point in the point cloud PC in stages, and includes a first local feature amount calculation unit 221, a second local feature amount calculation unit 222, and a third local feature amount calculation unit 223.

The first local feature amount calculation unit 221 calculates first feature amounts that are feature amounts of the first hierarchy in units of groups each group including a plurality of points among the points constituting the point cloud PC, and outputs the first feature amounts to the second local feature amount calculation unit 222 and a first global feature amount calculation unit 243 of the global feature amount calculation unit 202.

Note that, here, the group that is a unit in which the first feature amounts are obtained by the first local feature amount calculation unit 221 is referred to as a first hierarchical group.

The second local feature amount calculation unit 222 calculates second feature amounts that are feature amounts of the second hierarchy in units of groups each group including a plurality of the first feature amounts among the first feature amounts obtained by the first local feature amount calculation unit 221, and outputs the second feature amounts to the third local feature amount calculation unit 223 and a second global feature amount calculation unit 242 of the global feature amount calculation unit 202.

Note that, here, the group that is a unit in which the second feature amounts are obtained by the second local feature amount calculation unit 222 is referred to as a second hierarchical group.

The third local feature amount calculation unit 223 calculates third feature amounts that are feature amounts of the third hierarchy in units of groups each group including a plurality of the second feature amounts among the second feature amounts obtained by the second local feature amount calculation unit 222, and outputs the third feature amounts to a third global feature amount calculation unit 241 of the global feature amount calculation unit 202.

Note that, here, the group that is a unit in which the third feature amounts are obtained by the third local feature amount calculation unit 223 is referred to as a third hierarchical group.

Figure 4:
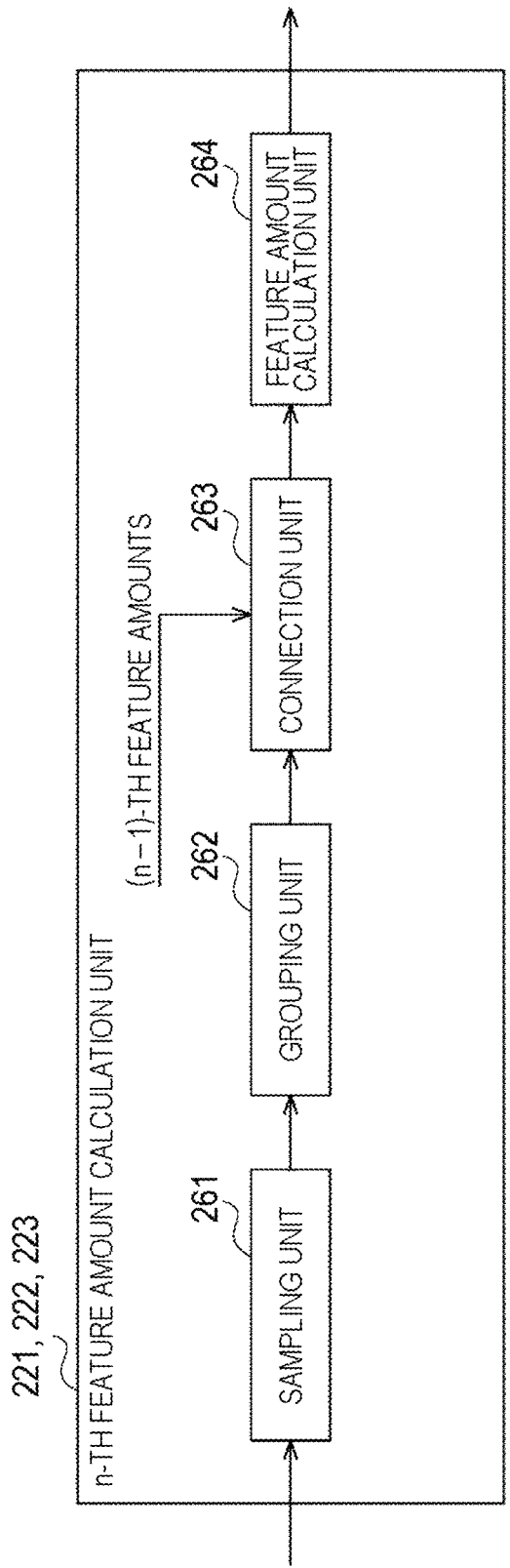
FIG. 4 is a block diagram for describing a configuration example of an n-th feature amount calculation unit in a local feature amount calculation unit in FIG. 4.

More specifically, as illustrated in FIG. 4, each of the first local feature amount calculation unit 221, the second local feature amount calculation unit 222, and the third local feature amount calculation unit 223 includes a sampling unit 261, a grouping unit 262, a connection unit 263, and a feature amount calculation unit 264.

Note that, since the configurations of the first local feature amount calculation unit 221, the second local feature amount calculation unit 222, and the third local feature amount calculation unit 223 are basically similar, they are illustrated as n-th feature amount calculation unit(s) in FIG. 4.

The sampling unit 261 samples (extracts) a point cloud including representative points designated such that a metric distance of each point becomes farther from among a given point cloud of the (n−1)-th hierarchical group (iterative farthest point sampling (FPS)), and outputs the point cloud to the grouping unit 262.

The grouping unit 262 groups, for each sampled representative point, position information of the other points (a point cloud other than the representative point) within a predetermined radius r, extracts the position information of a point cloud of the n-th hierarchical group, and outputs the position information to the connection unit 263.

The connection unit 263 connects the position information grouped for each representative point of the n-th hierarchical group supplied from the grouping unit 262 and the feature amounts of the corresponding (n−1)-th hierarchical group, and outputs connected information to the feature amount calculation unit 264.

The feature amount calculation unit 264 calculates the feature amount of each sampled representative point on the basis of the position information of the point cloud grouped for each representative point among the point cloud of the n-th hierarchical group, and the corresponding feature amounts, and outputs the feature amounts to the (n+1)-th feature amount calculation unit in a subsequent stage or the global feature amount calculation unit 202 as the feature amounts in the point cloud of the n-th hierarchical group that is one hierarchy higher than the (n−1)-th hierarchical group.

Figure 5:
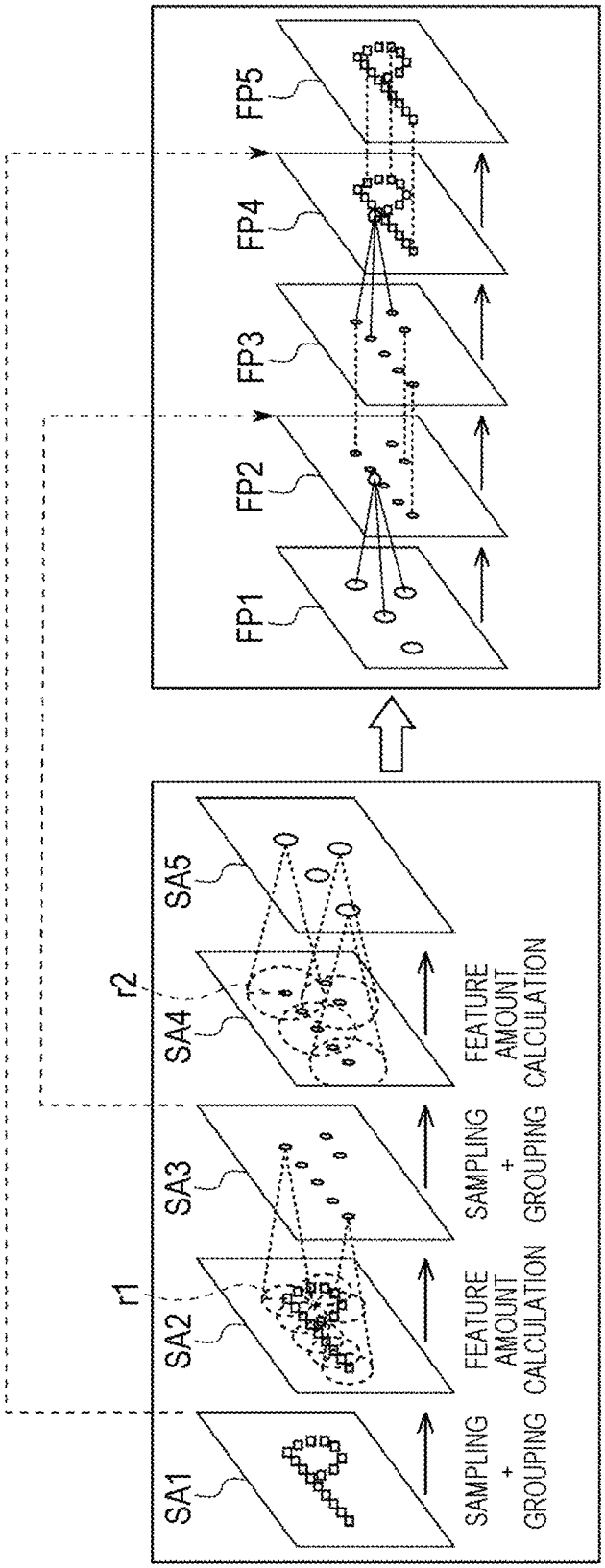
FIG. 5 is a block diagram for describing processing in the local feature amount calculation unit and a global feature amount calculation unit in FIG. 4.

That is, for example, as illustrated in the left part of FIG. 5, when information SA1 that is the point cloud information including the feature amounts of the (n−1)-th hierarchical group is supplied, the sampling unit 261 of the n-th feature amount calculation unit in the local feature amount calculation unit 201 samples the representative point so that the metric distance of each point becomes farther from among the point cloud (extracts the designated point cloud).

Then, as indicated by information SA2, the grouping unit 262 of the n-th feature amount calculation unit in the local feature amount calculation unit 201 extracts and groups another point cloud within a range of a predetermined radius r1 indicated by the dotted circle for each sampled representative point. At this time, the connection unit 263 connects the information of the grouped point cloud and the feature amounts of the (n−1)-th hierarchical group and outputs the connected information to the feature amount calculation unit 264.

The feature amount calculation unit 264 of the n-th feature amount calculation unit in the local feature amount calculation unit 201 calculates the feature amount for each representative point on the basis of the grouped point cloud, and outputs the feature amounts as information SA3 including the feature amounts of the n-th hierarchical group.

The sampling unit 261 of the (n+1)-th feature amount calculation unit in the subsequent stage in the local feature amount calculation unit 201 samples (extracts the designated point cloud) the representative point so that the metric distance of each point becomes farther from among the point cloud according to the information SA3 as the point cloud information including the feature amounts of the n-th hierarchical group.

Then, as indicated by information SA4, the grouping unit 262 of the (n+1)-th feature amount calculation unit in the local feature amount calculation unit 201 extracts and groups another point cloud within a range of a radius r2 (>r1) indicated by the dotted circle for each sampled representative point.

Moreover, the feature amount calculation unit 264 of the (n+1)-th feature amount calculation unit in the local feature amount calculation unit 201 calculates the feature amount for each representative point on the basis of the grouped point cloud, and outputs information SA5 of a point cloud including the feature amounts of the (n+1)-th hierarchical group.

Thereafter, similar processing is repeated, so that the hierarchized local feature amounts are sequentially calculated and finally output to the global feature amount calculation unit 202. Here, since the radii r1 and r2 gradually increase, the feature amounts gradually become thinner (sparse state) as the hierarchy progresses.

Here, the description returns to FIG. 3.

The global feature amount calculation unit 202 calculates and outputs the global feature amount R at each point on the basis of the first feature amounts, the second feature amounts, and the third feature amounts supplied from the local feature amount calculation unit 201.

More specifically, the global feature amount calculation unit 202 includes the third global feature amount calculation unit 241, the second global feature amount calculation unit 242, and the first global feature amount calculation unit 243.

The third global feature amount calculation unit 241 restores the feature amounts including the point cloud in units of the second hierarchical group on the basis of the third feature amounts supplied from the third local feature amount calculation unit 223 and the second feature amounts supplied from the second local feature amount calculation unit 222 of the local feature amount calculation unit 201, and outputs a restoration result to the second global feature amount calculation unit 242 as the global feature amount R in units of the second hierarchical group.

More specifically, the third global feature amount calculation unit 241 extends the third feature amounts supplied from the third local feature amount calculation unit 223 by using the second feature amounts in units of the second hierarchical group supplied from the second local feature amount calculation unit 222, and restores the third feature amounts as the second feature amounts that are the feature amounts of the point cloud in units of the second hierarchical group. Then, the third global feature amount calculation unit 241 outputs the restoration result to the second global feature amount calculation unit 242 as the global feature amount R in units of the second hierarchical group.

The second global feature amount calculation unit 242 restores the feature amount in units of the first hierarchical group on the basis of the global feature amount R in units of the second hierarchical group supplied from the second global feature amount calculation unit 242 and the first feature amounts supplied from the first local feature amount calculation unit 221, and outputs the restoration result to the first global feature amount calculation unit 243 as the global feature amount R in units of the first hierarchical group.

More specifically, the second global feature amount calculation unit 242 extends the second feature amount supplied from the third global feature amount calculation unit 241 by using the first feature amounts in units of the first hierarchical group supplied from the first local feature amount calculation unit 221, and restores the second feature amount as the first feature amounts that are the feature amounts of the point cloud in units of the first hierarchical group. Then, the second global feature amount calculation unit 242 outputs the restoration result to the first global feature amount calculation unit 243 as the global feature amount R in units of the first hierarchical group.

The first global feature amount calculation unit 243 restores the feature amount in units of each point on the basis of the global feature amount R in units of the first hierarchical group supplied from the second global feature amount calculation unit 242 and the point cloud PC, and outputs the restoration result to the recognition unit 203 as the global feature amount R.

The recognition unit 203 executes object recognition processing (semantic segmentation) based on the global feature amount R and outputs an object recognition result.

Figure 6:
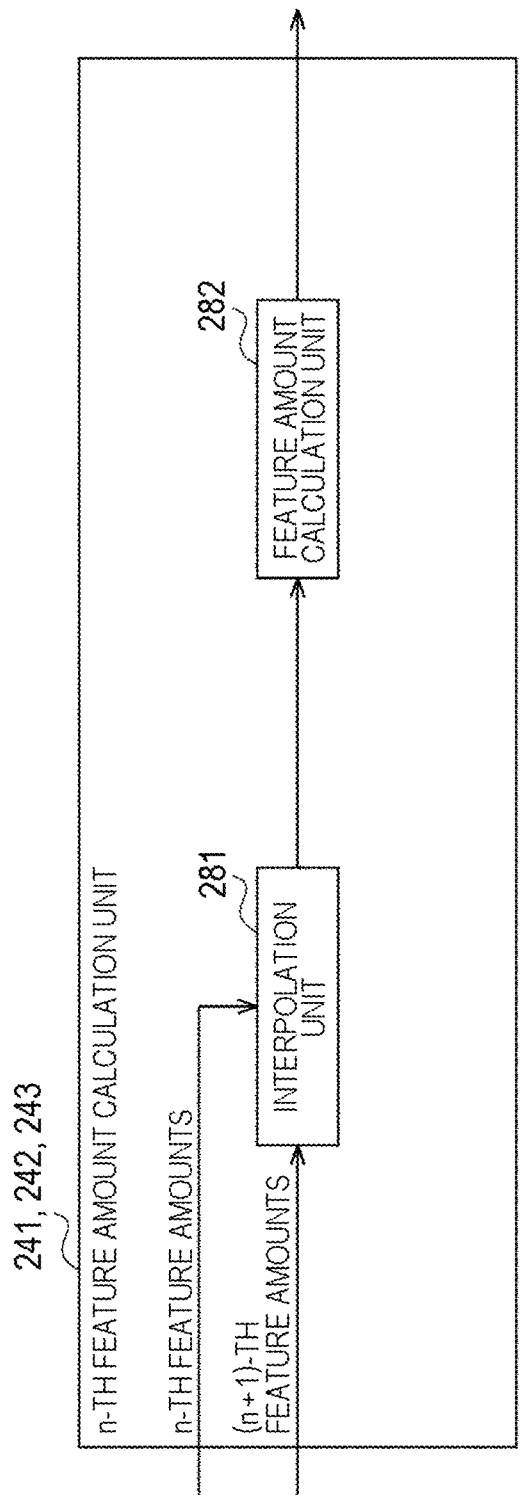
FIG. 6 is a block diagram for describing a configuration example of an n-th feature amount calculation unit in the global feature amount calculation unit in FIG. 4.

More specifically, as illustrated in FIG. 6, each of the third global feature amount calculation unit 241, the second global feature amount calculation unit 242, and the first global feature amount calculation unit 243 in the global feature amount calculation unit 202 includes an interpolation unit 281 and a feature amount calculation unit 282.

Note that, since the configurations of the third global feature amount calculation unit 241, the second global feature amount calculation unit 242, and the first global feature amount calculation unit 243 in the global feature amount calculation unit 202 are basically similar, they are illustrated as n-th feature amount calculation unit(s) in FIG. 6.

The interpolation unit 281 performs interpolation processing based on the position information and the feature amounts of the point cloud of the (n+1)-th hierarchical group and the position information and the feature amounts of the n-th hierarchical group to interpolate and generate position information of a point cloud constituting the n'-th hierarchical group, and sends the position information to the feature amount calculation unit 282. Note that "'" is added to the hierarchy to be restored.

The feature amount calculation unit 282 restores the position information of the point cloud of the n'-th hierarchical group supplied from the interpolation unit 281 and the corresponding feature amounts, and outputs the position information and the feature amounts of the point cloud of the n'-th hierarchical group to the (n−1)-th feature amount calculation unit in the subsequent stage in the global feature amount calculation unit 202.

That is, for example, as illustrated in the right part of FIG. 5, when information FP1 corresponding to the information SA5 that is the point cloud information including the feature amounts of the (n+1)-th hierarchical group is supplied, the interpolation unit 281 of the n-th feature amount calculation unit in the global feature amount calculation unit 202 interpolates and generates information FP2 including the position information of the point cloud of the n'-th hierarchical group.

Moreover, the feature amount calculation unit 282 of the n-th feature amount calculation unit in the global feature amount calculation unit 202 calculates the feature amounts of the point cloud of the interpolated and generated information FP2, and restores information FP3 including the position information and the feature amounts of the point cloud of the n'-th hierarchical group and corresponding to the information SA3.

The interpolation unit 281 of the (n−1)-th feature amount calculation unit in the subsequent stage in the global feature amount calculation unit 202 interpolates and generates information FP4 including the position information of the (n−1)-th hierarchical group from information FP3 as the point cloud information having the feature amounts of the n'-th hierarchical group.

Then, the feature amount calculation unit 282 of the (n−1)-th feature amount calculation unit calculates the feature amounts of the point cloud of the interpolated and generated information FP4, and restores information FP5 corresponding to the information SA1 of the point cloud of the (n−1)'-th hierarchical group.

Thereafter, the hierarchized local feature amounts are repeatedly calculated by the above-described inverse distance weighted interpolation method, so that the global feature amount R is finally calculated.

As described above, in the object recognition unit 181 in FIG. 3, the local feature amount calculation unit 201 and the global feature amount calculation unit 202 form PointNet++ by DNN.

Therefore, the local feature amount calculation unit 201 in FIG. 3 is configured to obtain the feature amounts by the three-stage hierarchical structure like the first local feature amount calculation unit 221 to the third local feature amount calculation unit 223, but the number of hierarchies may be any number other than two or three as long as the hierarchical structure has at least two or more hierarchies corresponding to the input layer and the output layer.

Then, the local feature amount calculation unit 201 and the global feature amount calculation unit 202 are assumed to perform learning (backpropagation) using, for example, a position (x, y, z) and a color (r, g, b) that are point clouds, as inputs, and a semantic segmentation label as a correct answer.

<Configuration Example of Object Recognition Unit of Present Disclosure>

As described above, in the case where the object recognition unit 181 is configured by PointNet++, appropriate semantic segmentation can be implemented when only the point cloud PC acquired by the LiDAR or only the sensing result by the millimeter wave radar is handled.

However, for example, when comparing a LiDAR point cloud PC including a dense sensing result and a LiDAR sensing result, when semantic segmentation is performed by integration with a sensing result of a millimeter wave radar including a relatively sparse sensing result, the feature amounts of both the sensing results cannot be appropriately integrated, and thus appropriate object recognition may not be able to be implemented.

That is, if both the sensing results are simply averaged, a large weight is generated in the dense sensing result, so that appropriate integration cannot be performed.

Furthermore, it is conceivable to set a weight in appropriately integrating the dense sensing result and the sparse sensing result. However, in the dense sensing result and the sparse sensing result, existence ratios in a local space are not constant. Therefore, even if a weight is simply set, appropriate integration cannot be performed.

Furthermore, it is conceivable to individually execute object recognition based on the dense sensing result and object recognition based on the sparse sensing result, and then integrate recognition results. However, when the object recognition results are different, the integration may not be able to be performed.

Therefore, the object recognition unit 181 of the present disclosure appropriately integrates the dense sensing result and the sparse sensing result by reflecting respective positional relationships of the sensing results, and then performs object recognition, thereby improving the recognition accuracy.

Figure 7:
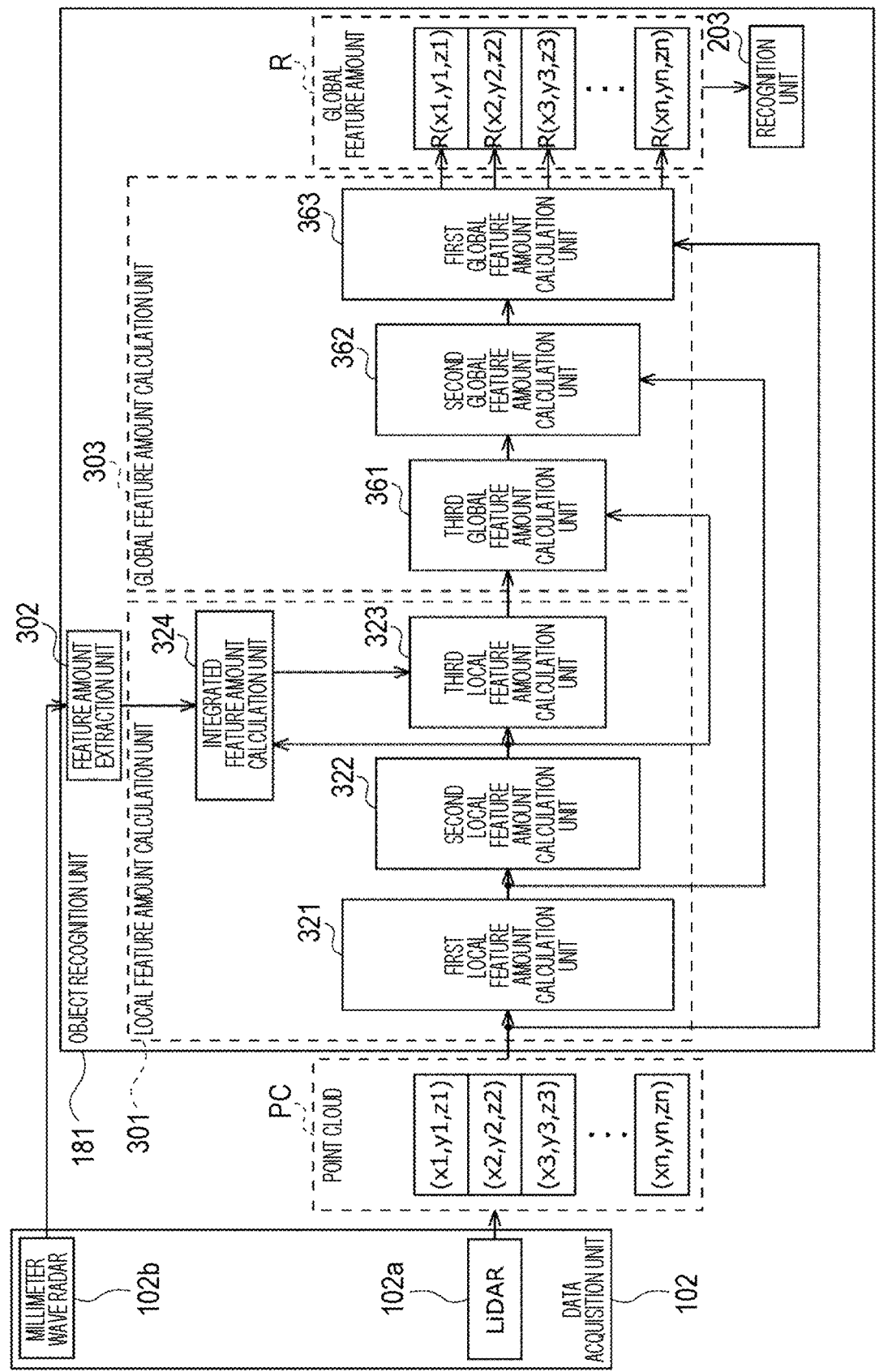
FIG. 7 is a block diagram for describing a configuration example of a first embodiment of an object recognition unit of the present disclosure.

FIG. 7 illustrates a configuration example of the object recognition unit 181 of the present disclosure that appropriately integrates the dense sensing result and the sparse sensing result by reflecting respective positional relationships of the sensing results, and then performs object recognition, thereby improving the recognition accuracy.

The object recognition unit 181 in FIG. 7 acquires a sparse sensing result of a millimeter wave radar 102b in addition to the point cloud PC that is a dense sensing result from a LiDAR 102a of the data acquisition unit 102, integrates and uses the sensing results, thereby implementing object recognition by semantic segmentation.

More specifically, the object recognition unit 181 in FIG. 7 includes a local feature amount calculation unit 301, a feature amount extraction unit 302, a global feature amount calculation unit 303, and a recognition unit 304.

Note that in the object recognition unit 181 in FIG. 7, the local feature amount calculation unit 301, the global feature amount calculation unit 303, and the recognition unit 304 basically correspond to the local feature amount calculation unit 201, the global feature amount calculation unit 202, and the recognition unit 203 in FIG. 3.

That is, the local feature amount calculation unit 301 includes a first local feature amount calculation unit 321, a second local feature amount calculation unit 322, and a third local feature amount calculation unit 323, and the first to third local feature amount calculation units have configurations respectively corresponding to the first local feature amount calculation unit 221, the second local feature amount calculation unit 222, and the third local feature amount calculation unit 223 in FIG. 3.

However, the local feature amount calculation unit 301 is different in further including an integrated feature amount calculation unit 324 in order to receive the feature amounts supplied from the feature amount extraction unit 302 that extracts the feature amounts of the sensing result of the millimeter wave radar 102b. Furthermore, the third local feature amount calculation unit 323 performs basic processing similar to the third local feature amount calculation unit 223 but also performs different processing.

Furthermore, due to provision of the integrated feature amount calculation unit 324, the local feature amount calculation unit 301 has a configuration corresponding to the integration processing unit 21 in FIG. 1, and the global feature amount calculation unit 303 has a configuration corresponding to the restoration unit 22 in FIG. 1.

Note that, since the first local feature amount calculation unit 321 and the second local feature amount calculation unit 322 have the same functions as the first local feature amount calculation unit 221 and the second local feature amount calculation unit 222 in FIG. 3, description thereof is omitted.

That is, when acquiring the sparse sensing result of the millimeter wave radar 102b, the feature amount extraction unit 302 extracts the feature amounts and supplies the feature amounts to the integrated feature amount calculation unit 324 of the local feature amount calculation unit 301.

The integrated feature amount calculation unit 324 integrates the feature amounts of the second hierarchical group obtained from the point cloud PC that is the sensing result of the LiDAR 102a that is the dense sensing result supplied from the second local feature amount calculation unit 322 and the feature amounts supplied from the feature amount extraction unit 302 obtained from the sparse sensing result of the millimeter wave radar 102b in consideration of the respective positional relationships, and supplies the integrated feature amounts to the third local feature amount calculation unit 323 as the feature amounts of the second hierarchical group.

More specifically, the integrated feature amount calculation unit 324 integrates the feature amounts obtained from the sparse sensing result of the millimeter wave radar 102b existing within a predetermined distance from respective positions with reference to the respective pieces of position information of the feature amounts of the second hierarchical group obtained from the point cloud PC that is the sensing result of the LiDAR 102a that is the dense sensing result supplied from the second local feature amount calculation unit 322.

Then, the integrated feature amount calculation unit 324 supplies the feature amounts obtained by integrating the feature amounts of the second hierarchical group obtained from the point cloud PC as the dense sensing result and the feature amounts obtained from the sparse sensing result of the millimeter wave radar 102b to the third local feature amount calculation unit 323 as the feature amounts of the second hierarchical group.

Note that a detailed configuration of the integrated feature amount calculation unit 324 and details of the method of integrating the feature amounts obtained from the sparse sensing result of the millimeter wave radar 102b existing within a predetermined distance from reference positions with reference to the positions of the feature amounts of the second hierarchical group obtained from the point cloud PC will be described below.

Furthermore, the basic function of the third local feature amount calculation unit 323 is similar to that of the third local feature amount calculation unit 223 except that, instead of the feature amounts of the second hierarchical group calculated by the second local feature amount calculation unit 322, the feature amounts of the third hierarchical group are calculated on the basis of the feature amounts obtained by integrating both the feature amounts supplied from the integrated feature amount calculation unit 324, and thus description thereof is omitted.

Furthermore, the global feature amount calculation unit 303 calculates and outputs the global feature amount R at each point on the basis of the first feature amounts, the second feature amounts, and the third feature amounts supplied from the local feature amount calculation unit 301.

More specifically, the global feature amount calculation unit 303 includes a third global feature amount calculation unit 361, a second global feature amount calculation unit 362, and a first global feature amount calculation unit 363.

Note that the third global feature amount calculation unit 361, the second global feature amount calculation unit 362, and the first global feature amount calculation unit 363 are configured to have the same functions as the third global feature amount calculation unit 241, the second global feature amount calculation unit 242, and the first global feature amount calculation unit 243 in FIG. 3, and thus description thereof is omitted.

Furthermore, since the recognition unit 304 has the same function as the recognition unit 203 in FIG. 3, description thereof is omitted.

<Method of Integrating Feature Amount of Dense Sensing Result and Feature Amount of Sparse Sensing Result and Method of Obtaining Global Feature Amount>

Next, the method of integrating the feature amounts obtained from the sparse sensing result of the millimeter wave radar 102b existing within a predetermined distance from reference positions with reference to the positions of the feature amounts of the second hierarchical group obtained from the point cloud PC, and the method of obtaining the global feature amount will be described with reference to FIGS. 8 and 9.

Figure 8:
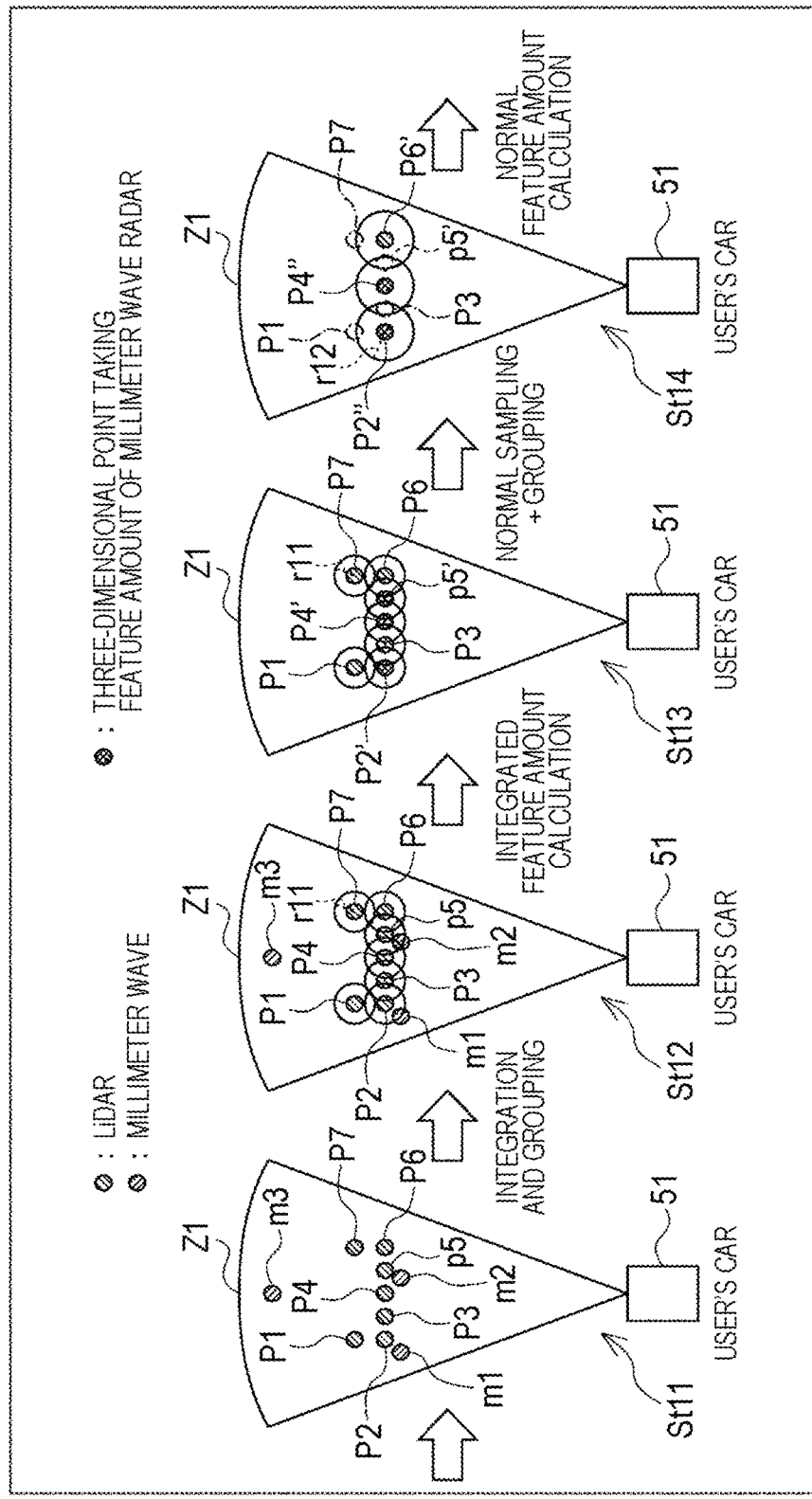
FIG. 8 is a diagram for describing a method of integrating feature amounts of different sparseness and denseness.

For example, as indicated by state St11 illustrated in the left part of FIG. 8, positions of the feature amounts of the second hierarchical group obtained from the point cloud PC that is the dense sensing result acquired by the LiDAR 102a are indicated as feature amounts P1 to P7, and positions of the feature amounts extracted from the sparse sensing result of the millimeter wave radar 102b are indicated as feature amounts m1 to m3.

Note that FIG. 8 illustrates the positions of the feature amounts P1 to P7 obtained on the basis of the dense sensing result and the feature amounts m1 to m3 obtained on the basis of the sparse sensing result in a monitoring area Z1 of the LiDAR 102a and the millimeter wave radar 102b of the data acquisition unit 102 from the vehicle 51 that is the user's car.

In the case of state St11 in FIG. 8, the integrated feature amount calculation unit 324 searches for the feature amount m1 to m3 based on sparse sensing result existing within a predetermined distance (within a radius r11) drawn by the solid circles with reference to the feature amounts P1 to P7 based on dense sensing result, as feature amounts to be grouped, as indicated by state St12 in FIG. 8.

In the case of state St12 in FIG. 8, the feature amount m1 is searched as the feature amount to be grouped within the predetermined distance of the feature amount P2 indicated by the solid circle, and the feature amount m2 is searched as the feature amount to be grouped within the predetermined distance of the feature amounts P4 and P5 indicated by the solid circles.

Here, since the feature amount m3 does not exist within the predetermined distance from any of the feature amounts P1 to P7 based on the dense sensing result and is not searched as the feature amount to be grouped, the feature amount m3 is excluded from the sparse feature amount to be integrated with the dense sensing result.

Next, the integrated feature amount calculation unit 324 integrates the feature amounts based on the dense sensing result with the feature amounts based on the sparse sensing result, among the feature amounts P1 to P7 based on the dense sensing result and having the feature amounts m1 to m3 based on the sparse sensing result to be grouped.

More specifically, the integrated feature amount calculation unit 324 obtains a relative position between the position of the feature amount based on the dense sensing result and the position of the feature amount based on the sparse sensing result from the position of the feature amount based on the dense sensing result and the corresponding position of the feature amount based on the sparse sensing result, and generates an integration table 332 (FIG. 10) to be associated with the feature amount based on the dense sensing result.

Figure 10:
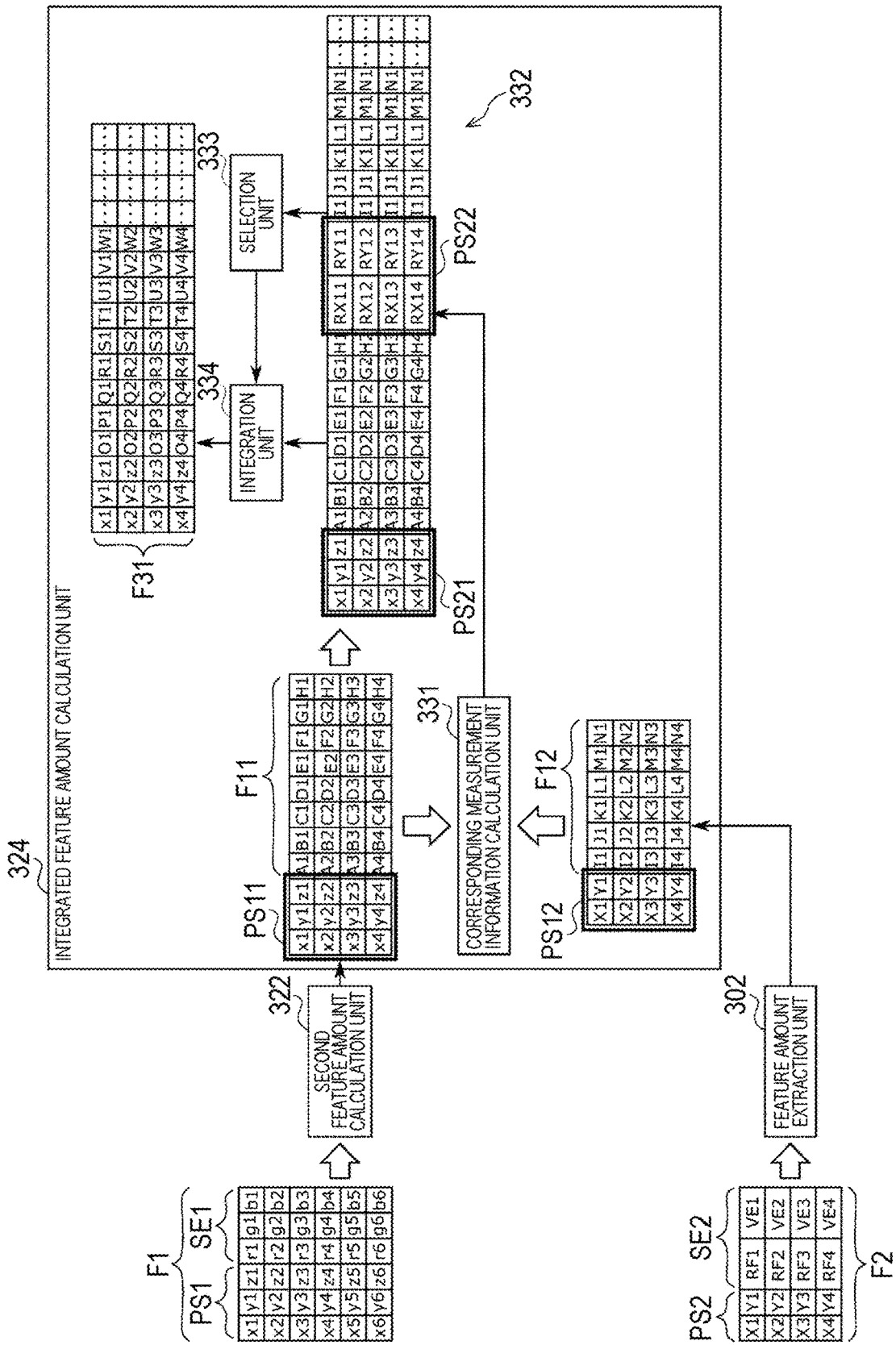
FIG. 10 is a diagram for describing an integration table generated when feature amounts having different sparseness and denseness are integrated.

The integrated feature amount calculation unit 324 integrates the feature amount based on the dense sensing result and the feature amount based on the sparse sensing result searched as the feature amount to be grouped within the predetermined distance on the basis of the integration table 332 (FIG. 10).

Note that a method of integrating the feature amounts using the integration table 332 (FIG. 10) will be described below in detail.

For example, in the case of state St12 in FIG. 8, the feature amount m1 is searched as the feature amount to be grouped within the predetermined distance of the feature amount P2, and the feature amount m2 is searched as the feature amount to be grouped within the predetermined distance of the feature amounts P4 and P5.

Therefore, as indicated by state St13, the integrated feature amount calculation unit 324 generates a feature amount P2' by integrating the feature amounts P2 and m1, generates a feature amount P4' by integrating the feature amounts P4 and m2, and generates a feature amount P5' by integrating the feature amounts P5 and m2. That is, the feature amount P2' is a feature amount obtained by taking the feature amount m1 based on the sensing result of the millimeter wave radar 102b into the feature amount P2 based on the sensing result of the LiDAR 102a. Furthermore, the feature amounts P4' and P5' are feature amounts obtained by taking the feature amount m2 based on the sensing result of the millimeter wave radar 102b into the feature amounts P4 and P5 based on the sensing result of the LiDAR 102a.

The integrated feature amount calculation unit 324 outputs the feature amounts P1, P2', P3, P4', P5', P6, and P7 indicated by state St13 in FIG. 8 to the third local feature amount calculation unit 323 as the feature amounts of the second hierarchical group.

The third local feature amount calculation unit 323 specifies, for example, the feature amounts P2', P4', and P6 among the feature amounts P1, P2', P3, P4', P5', P6, and P7 indicated by state St13 as predetermined feature amounts, and groups the feature amounts within a predetermined distance from the specified feature amounts P2' P4' and P6 and calculates the feature amounts.

Thereby, for example, as indicated by state St14, the third local feature amount calculation unit 323 groups the feature amounts P1 and P3 within a predetermined distance (within the radius r12 (>r11)) from the feature amount P2' indicated by the solid circle and calculates a feature amount P2".

Similarly, as indicated by state St14, the third local feature amount calculation unit 323 groups the feature amounts P3 and P5' within the predetermined distance from the feature amount P4' indicated by the solid circle and calculates a feature amount P4".

Moreover, as indicated by state St14, the third local feature amount calculation unit 323 groups the feature amounts P5' and P7 within the predetermined distance from the feature amount P6 indicated by the solid circle and calculates a feature amount P6'.

The third local feature amount calculation unit 323 outputs the feature amounts of the third hierarchical group including the feature amounts P2", P4", and P6' indicated by state St14 calculated as described above to the global feature amount calculation unit 303.

Figure 9:
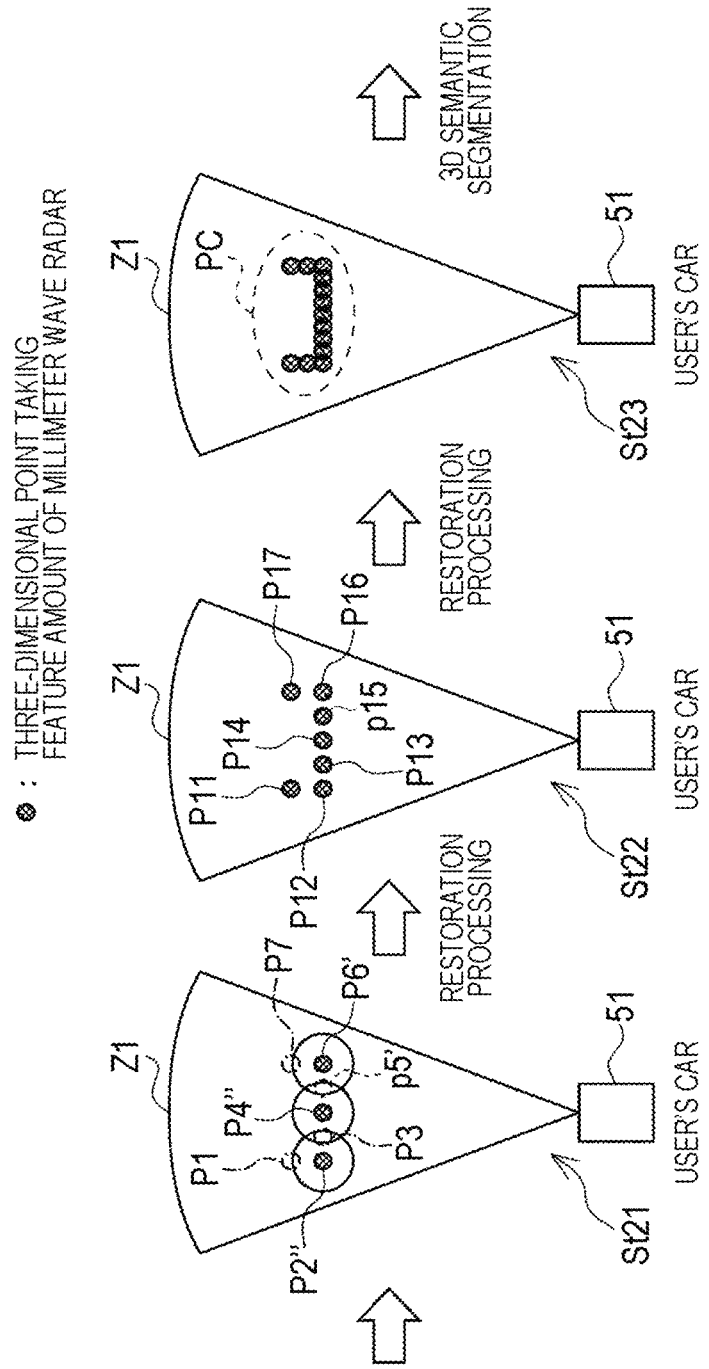
FIG. 9 is a diagram for describing a method of obtaining a global feature amount from a feature amount in which feature amounts having different sparseness and denseness are integrated.

When acquiring the feature amounts of the third hierarchical group of state St21 in FIG. 9 corresponding to state St14 in FIG. 8, the third global feature amount calculation unit 361 of the global feature amount calculation unit 303 specifies the positions of the feature amounts P1, P3, P5, and P7 corresponding to the second hierarchical group by interpolation from the position information of the feature amounts P2", P4", and P6' on the basis of the information supplied from the second local feature amount calculation unit 322 of the local feature amount calculation unit 301, and specifies position information corresponding to the feature amounts P1 to P7 in St11 in FIG. 8.

Then, as indicated by state St22, the third global feature amount calculation unit 361 calculates feature amounts P11 to P17 at positions corresponding to the specified feature amounts P1 to P7 on the basis of the feature amounts P2", P4", and P6', and outputs the calculated feature amounts to the second global feature amount calculation unit 362 as the feature amounts of the second hierarchical group.

Hereinafter, the second global feature amount calculation unit 362 and the first global feature amount calculation unit 363 repeat similar processing, so that the global feature amount R corresponding to the point cloud PC is calculated and output to the recognition unit 304 as indicated by state St23.

The recognition unit 304 recognizes an object by the object recognition processing such as semantic segmentation on the basis of the global feature amount R.

Through the above-described series of processing, the feature amounts having different sparseness and denseness are integrated, and the dense feature amounts can be generated, by integrating the feature amounts based on the sparse sensing result such as the millimeter wave radar 102b existing within a predetermined distance with the feature amounts based on the dense sensing result such as the LiDAR 102a with reference to the feature amounts based on the dense sensing result.

As a result, it becomes possible to implement the object recognition such as semantic segmentation on the basis of the dense feature amounts generated by appropriately integrating the sensing results of sensors having different sparseness and denseness, and thus, it becomes possible to improve the object recognition accuracy.

<Detailed Configuration of Integrated Feature Amount Calculation Unit and Method of Integrating Feature Amounts Using Integration Table>

Next, a detailed configuration of the integrated feature amount calculation unit 324 and a method of integrating the feature amounts using an integration table will be described with reference to FIG. 10.

The integrated feature amount calculation unit 324 includes a corresponding measurement information calculation unit 331, an integration table 332, a selection unit 333, and an integration unit 334.

The corresponding measurement information calculation unit 331 generates the integration table 332 on the basis of the second feature amounts supplied from the second local feature amount calculation unit 322 obtained on the basis of the point cloud PC that is the dense sensing result obtained from the LiDAR 102a and the feature amounts supplied from the feature amount extraction unit 302 obtained on the basis of the sparse sensing result obtained from the millimeter wave radar 102b.

As the integration table 332, the integration table 332 including corresponding measurement information indicating a relative positional relationship of the sparse sensing result with reference to the second feature amounts based on the dense sensing result is generated.

Here, a specific method of generating the integration table 332 by the corresponding measurement information calculation unit 331 will be described.

For example, it is assumed that a sensing result F1 corresponding to the point cloud PC corresponding to the sensing result of the LiDAR 102a is supplied, and a sensing result F2 is supplied as a sensing result corresponding to the sensing result of the millimeter wave radar 102b.

The sensing result F1 includes position information PS1 and a sensing result SE1 including information of color, for example. In FIG. 10, the first to third columns from the left are the position information PS1 of each point cloud, and the fourth to sixth columns are the sensing result SE1 at the corresponding positions.

That is, in the sensing result F1, as illustrated in the uppermost row, it is indicated that the sensing result is (r1, g1, b1) at the position (x1, y1, z1), and as illustrated in the second row, it is indicated that the sensing result is (r2, g2, b2) at the position (x2, y2, z2), and thereafter, the position and the sensing result are similarly recorded in association with each other.

Furthermore, the sensing result F2 includes position information PS2 and a sensing result SE2 including, for example, information of speed or reflection intensity. The first and second columns from the left are the position information PS2, and the third and fourth columns are the sensing result SE2.

That is, in the sensing result F2, as illustrated in the uppermost row, it is indicated that the sensing result is (RF1, VE1) at the position (X1, Y1), it is indicated that the sensing result is (RF2, VE2) at the position (X2, Y2), and thereafter, the position and the sensing result are similarly recorded in association with each other.

The second local feature amount calculation unit 322 calculates feature amounts F11 as the feature amounts of the second hierarchical group from the sensing result F1, for example, and outputs the feature amounts F11 to the integrated feature amount calculation unit 324.

Here, regarding the feature amounts F11, the first to third columns from the left are position information PS11, and the fourth and subsequent columns are (values of) specific feature amounts. Furthermore, the position information PS11 is information corresponding to the position information PS1.

That is, in the feature amounts F11, it is indicated that the feature amounts are (A1, B1, C1, D1, E1, F1, G1, H1) at the uppermost position (x1, y1, z1), it is indicated that the feature amounts are (A2, B2, C2, D2, E2, F2, G2, H2) at the position (x2, y2, z2) as illustrated in the second row, and thereafter, the position and the feature amounts are similarly recorded in association with each other.

Furthermore, the feature amount extraction unit 302 calculates, for example, feature amounts F12 from the sensing result F2, and outputs the feature amounts F12 to the integrated feature amount calculation unit 324.

Here, in the feature amounts F12, the first and second columns from the left are position information PS12, and the third and subsequent columns are (values of) specific feature amounts. Further, the position information PS12 is information corresponding to the position information PS2.

That is, in the feature amounts F12, it is indicated that the feature amounts are (I1, J1, K1, L1, M1, N1) at the uppermost position (X1, Y1), and it is indicated that the feature amounts are (I2, J2, K2, L2, M2, N2) at the position (X2, Y2) as illustrated in the second row. Thereafter, the position and the feature amounts are similarly recorded in association with each other.

The corresponding measurement information calculation unit 331 generates the integration table 332 including information of relative positions of the feature amounts F12 with reference to the position information PS11 of the feature amounts F11 obtained on the basis of the dense sensing result, on the basis of the feature amounts F11 and F12.

That is, for example, the corresponding measurement information calculation unit 331 calculates a relative position (RX11, RY11) between the position (x1, y1, z1) of the feature amounts F11 obtained on the basis of the dense sensing result and the position (X1, Y1) of the feature amounts F12 obtained on the basis of the sparse sensing result, and registers the relative position together with the feature amounts (I1, J1, K1, L1, M1, N1) on the right side of the feature amounts (A1, B1, C1, D1, E1, F1, G1, H1), as illustrated in the uppermost row of the integration table 332.

Furthermore, although not illustrated, the relative positions between the position (x1, y1, z1) of the feature amounts F11 and the feature amounts F12 of other positions (X2, Y2), (X3, Y3), and (X4, Y4), and the feature amounts are sequentially registered in the right direction in the drawing.

Moreover, for example, the corresponding measurement information calculation unit 331 calculates a relative position (RX12, RY12) between the position (x2, y2, z2) of the feature amounts F11 obtained on the basis of the dense sensing result and the position (X1, Y1) of the feature amounts F12 obtained on the basis of the sparse sensing result, and registers the relative position together with the feature amounts (I1, J1, K1, L1, M1, N1) on the right side of the feature amounts (A2, B2, C2, D2, E2, F2, G2, H2), as illustrated in the second row of the integration table 332.

Furthermore, although not illustrated, the relative positions between the position (x2, y2, z2) of the feature amounts F11 and the feature amounts F12 of other positions (X2, Y2), (X3, Y3), and (X4, Y4), and the feature amounts are sequentially registered in the right direction in the drawing.

Moreover, for example, the corresponding measurement information calculation unit 331 calculates a relative position (RX13, RY13) between the position (x3, y3, z3) of the feature amounts F11 obtained on the basis of the dense sensing result and the position (X1, Y1) of the feature amounts F12 obtained on the basis of the sparse sensing result, and registers the relative position together with the feature amounts (I1, J1, K1, L1, M1, N1) on the right side of the feature amounts (A3, B3, C3, D3, E3, F3, G3, H3), as illustrated in the third row of the integration table 332.

Furthermore, although not illustrated, the relative positions between the position (x3, y3, z3) of the feature amounts F11 and the feature amounts F12 of other positions (X2, Y2), (X3, Y3), and (X4, Y4), and the feature amounts are sequentially registered in the right direction in the drawing.

Moreover, for example, the corresponding measurement information calculation unit 331 calculates a relative position (RX14, RY14) between the position (x4, y4, z4) of the feature amounts F11 obtained on the basis of the dense sensing result and the position (X1, Y1) of the feature amounts F12 obtained on the basis of the sparse sensing result, and registers the relative position together with the feature amounts (I1, J1, K1, L1, M1, N1) on the right side of the feature amounts (A4, B4, C4, D4, E4, F4, G4, H4), as illustrated in the fourth row of the integration table 332.

Furthermore, although not illustrated, the relative positions between the position (x4, y4, z4) of the feature amounts F11 and the feature amounts F12 of other positions (X2, Y2), (X3, Y3), and (X4, Y4), and the feature amounts are sequentially registered in the right direction in the drawing.

That is, in the integration table 332, the three columns from the left are the position information PS21 of the feature amounts F11 obtained on the basis of the dense sensing result, and the six columns on the right are the respective feature amounts F11. Moreover, on the right side thereof, relative position information PS22 with each of the feature amounts F12 obtained on the basis of the sparse sensing results is registered, and the corresponding feature amounts F12 are registered. Here, the position information PS21 is information corresponding to the position information PS1 and PS11.

Note that, in FIG. 10, only the relative position between the feature amount of each of the positions (x1, y1, z1) to (x4, y4, z4) based on the dense sensing results and the feature amount (I1, J1, K1, L1, M1, N1) of the position (X1, Y1) based on the sparse sensing results and the feature amount are illustrated, but the relative position between the feature amount based on the sparse sensing results other than the above and the feature amount are sequentially registered in the right direction while not illustrated.

As described above, in the integration table 332 including the corresponding measurement information, the information of the relative positions of the feature amounts based on the sparse sensing result with reference to the feature amounts based on the dense sensing result is registered.

The selection unit 333 selects groupable feature amounts based on the sparse sensing result existing within a predetermined distance for each feature amount based on the dense sensing result serving as a reference on the basis of the relative position information of the integration table 332 including corresponding measurement information, and supplies a selection result to the integration unit 334.

The integration unit 334 outputs an integrated feature amount F31 by integrating the groupable feature amounts based on the sparse sensing result existing within the predetermined distance for each feature amount based on the dense sensing result, on the basis of the selection result supplied from the selection unit 333.

That is, in the case of FIG. 10, the selection unit 333 selects the feature amounts (I1, J1, K1, L1, M1, N1) as feature amounts to be grouped in the case of being regarded to exist within the predetermined distance on the basis of the relative position (RX11, RY11) between the feature amounts (A1, B1, C1, D1, E1, F1, G1, H1) at the position (x1, y1, z1) and the feature amounts (I1, J1, K1, L1, M1, N1) indicated at the uppermost row of the integration table 332.

Then, as illustrated in the uppermost row of the integrated feature amount F31 in FIG. 10, the integration unit 334 integrates the grouped feature amounts existing within the predetermined distance with reference to the feature amounts (A1, B1, C1, D1, E1, F1, G1, H1) at the position (x1, y1, z1) on the basis of the selection result supplied from the selection unit 333, and outputs the integrated feature amounts as feature amounts (O1, P1, Q1, R1, S1, T1, U1, V1, W1, ... ) at the position (x1, y1, z1), for example.

Furthermore, in the case of FIG. 10, the selection unit 333 selects the feature amounts (I1, J1, K1, L1, M1, N1) as feature amounts to be grouped into the feature amounts (A2, B2, C2, D2, E2, F2, G2, H2) in the case of being regarded to exist within the predetermined distance on the basis of the relative position (RX12, RY12) between the feature amounts (A2, B2, C2, D2, E2, F2, G2, H2) at the position (x2, y2, z2) and the feature amounts (I1, J1, K1, L1, M1, N1) indicated in the second row of the integration table 332.

Then, as illustrated in the second row of the integrated feature amount F31 in FIG. 10, the integration unit 334 integrates the grouped feature amounts existing within the predetermined distance with reference to the feature amounts (A2, B2, C2, D2, E2, F2, G2, H2) at the position (x2, y2, z2) on the basis of the selection result supplied from the selection unit 333, and outputs the integrated feature amounts as feature amounts (O2, P2, Q2, R2, S2, T2, U2, V2, W2, . . . ) at the position (x2, y2, z2), for example.

Moreover, in the case of FIG. 10, the selection unit 333 selects the feature amounts (I1, J1, K1, L1, M1, N1) as feature amounts to be grouped into the feature amounts (A3, B3, C3, D3, E3, F3, G3, H3) in the case of being regarded to exist within the predetermined distance on the basis of the relative position (RX13, RY13) between the feature amounts (A3, B3, C3, D3, E3, F3, G3, H3) at the position (x3, y3, z3) and the feature amounts (I1, J1, K1, L1, M1, N1) indicated in the third row of the integration table 332.

Then, as illustrated in the third row of the integrated feature amount F31 in FIG. 10, the integration unit 334 integrates the grouped feature amounts existing within the predetermined distance with reference to the feature amounts (A3, B3, C3, D3, E3, F3, G3, H3) at the position (x3, y3, z3) on the basis of the selection result supplied from the selection unit 333, and outputs the integrated feature amounts as feature amounts (O3, P3, Q3, R3, S3, T3, U3, V3, W3, . . . ) at the position (x3, y3, z3), for example.

Furthermore, in the case of FIG. 10, the selection unit 333 selects the feature amounts (I1, J1, K1, L1, M1, N1) as feature amounts to be grouped into the feature amounts (A4, B4, C4, D4, E4, F4, G4, H4) in the case of being regarded to exist within the predetermined distance on the basis of the relative position (RX14, RY14) between the feature amounts (A4, B4, C4, D4, E4, F4, G4, H4) at the position (x4, y4, z4) and the feature amounts (I1, J1, K1, L1, M1, N1) indicated in the fourth row of the integration table 332.

Then, as illustrated in the fourth row of the integrated feature amount F31 in FIG. 10, the integration unit 334 integrates the grouped feature amounts existing within the predetermined distance with reference to the feature amounts (A4, B4, C4, D4, E4, F4, G4, H4) at the position (x4, y4, z4) on the basis of the selection result supplied from the selection unit 333, and outputs the integrated feature amounts as feature amounts (O4, P4, Q4, R4, S4, T4, U4, V4, W4, . . . ) at the position (x4, y4, z4), for example.

As described above, in integrating the feature amounts based on the sensing result having different sparseness and denseness, the corresponding measurement information calculation unit 331 generates the integration table 332, and registers the feature amounts including the relative position information between the position of the feature amounts based on the dense sensing result and the feature amounts based on the sparse sensing result.

Next, the selection unit 333 groups the feature amounts of the sparse sensing result within a predetermined distance for each feature amount of dense sensing result on the basis of the relative position information of the integration table 332.

Then, the integration unit 334 integrates the grouped feature amounts of the sparse sensing results for each feature amount of the dense sensing result.

Thereby, the feature amounts based on the sparseness and denseness are appropriately integrated, and the feature amounts based on the dense sensing result can be generated.

As a result, the feature amounts based on the sensing results having different sparseness and denseness are appropriately integrated, and the feature amounts based on the dense sensing result are generated and used for the object recognition processing such as semantic segmentation, whereby the recognition accuracy can be improved.

<Object Recognition Processing in First Embodiment>

Figure 11:
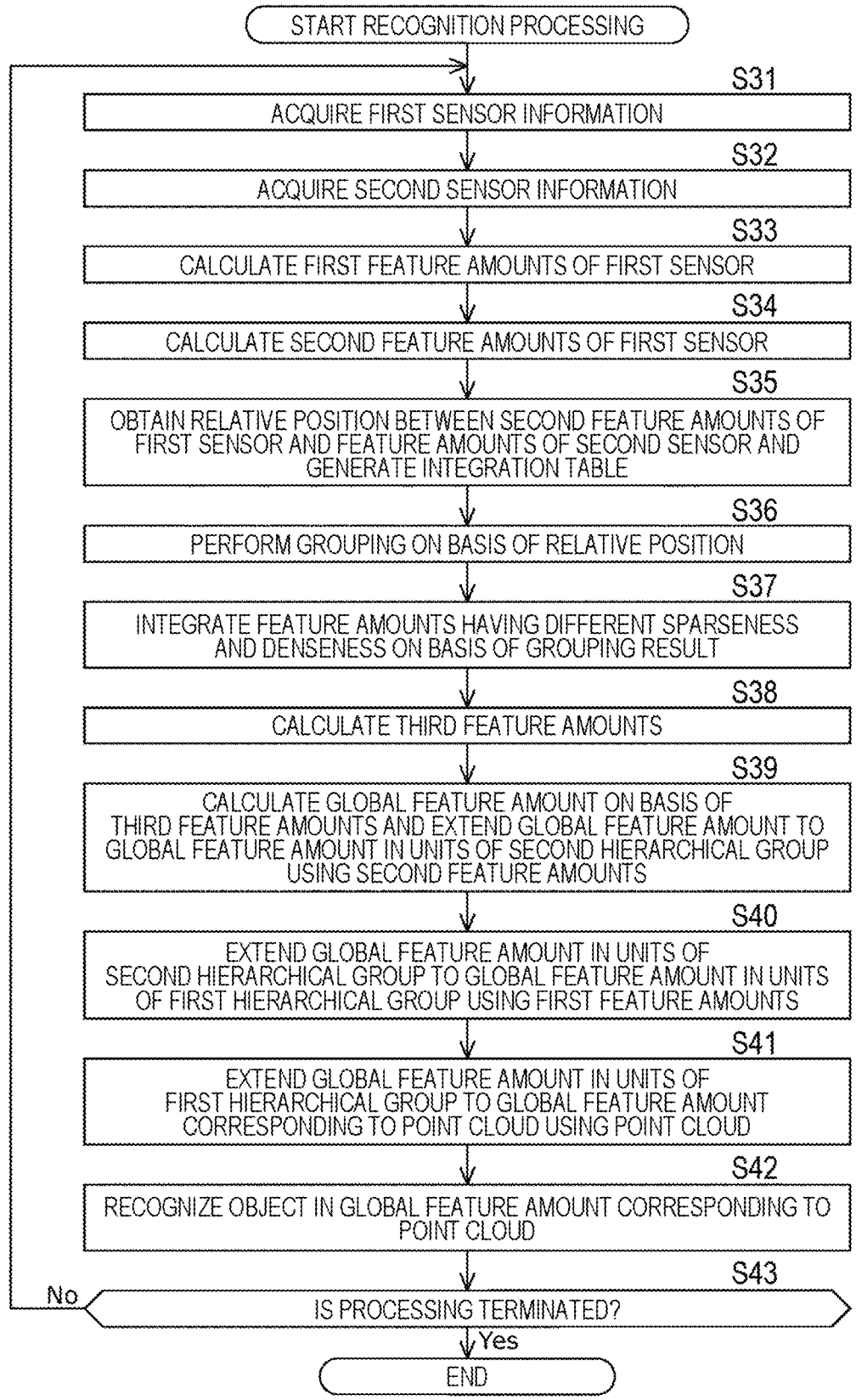
FIG. 11 is a flowchart for describing object recognition processing of the first embodiment.

Next, the object recognition processing by the object recognition unit 181 in FIG. 7 according to the first embodiment will be described with reference to the flowchart in FIG. 11.

In step S31, the first local feature amount calculation unit 321 of the local feature amount calculation unit 301 acquires the point cloud PC that is the dense sensing result obtained by the first sensor including the LiDAR 102a supplied from the data acquisition unit 102. At this time, the first global feature amount calculation unit 363 of the global feature amount calculation unit 303 also acquires the point cloud PC that is the dense sensing result obtained by the LiDAR 102a supplied from the data acquisition unit 102.

In step S32, the feature amount extraction unit 302 acquires the sparse sensing result obtained by the second sensor including the millimeter wave radar 102b supplied from the data acquisition unit 102, extracts the feature amounts, and outputs the feature amounts to the integrated feature amount calculation unit 324.

In step S33, the first local feature amount calculation unit 321 calculates the first feature amounts that are the feature amounts in units of the first hierarchical group from the point cloud PC, and outputs the first feature amounts to the second local feature amount calculation unit 322 and the second global feature amount calculation unit 362 of the global feature amount calculation unit 303.

In step S34, the second local feature amount calculation unit 322 acquires the first feature amounts supplied from the first local feature amount calculation unit 321, calculates the second feature amounts that are the feature amounts in units of the second hierarchical group from the first feature amounts, and outputs the second feature amounts to the third local feature amount calculation unit 323 and the first global feature amount calculation unit 363 of the global feature amount calculation unit 303.

In step S35, the integrated feature amount calculation unit 324 causes the corresponding measurement information calculation unit 331 to calculate the relative position between the feature amounts based on the sparse sensing result of the millimeter wave radar 102b as the sensing result of the second sensor and the position of the second feature amounts based on the point cloud PC that is the dense sensing result of the LiDAR 102a as the first sensor, and generate the integration table 332.

In step S36, the integrated feature amount calculation unit 324 controls the selection unit 333 to group the feature amounts based on the sparse sensing result existing within a predetermined distance with reference to the second feature amounts based on the dense sensing result on the basis of the relative position information of the integration table 332, and causes the integration unit 334 to output the feature amounts as the selection result.

In step S37, the integrated feature amount calculation unit 324 controls the integration unit 334 to integrate the grouped feature amounts based on the sparse sensing result of the second sensor including the millimeter wave radar 102b, for each second feature amount based on the dense sensing result of the first sensor including the LiDAR 102a, on the basis of the selection result, and outputs the integrated feature amounts as the feature amounts of the second hierarchical group to the third local feature amount calculation unit 323.

In step S38, the third local feature amount calculation unit 323 acquires the second feature amounts obtained by integrating the second feature amounts based on the dense sensing result of the first sensor including the LiDAR 102a and the feature amounts based on the sparse sensing result of the second sensor including the millimeter wave radar 102b, which are supplied from the integrated feature amount calculation unit 324. Then, the third local feature amount calculation unit 323 calculates the third feature amounts that are feature amounts in units of the third hierarchical group from the acquired second feature amounts, and outputs the third feature amounts to the third global feature amount calculation unit 361 of the global feature amount calculation unit 303.

In step S39, the third global feature amount calculation unit 361 of the global feature amount calculation unit 303 calculates the global feature amount R in units of the third hierarchical group on the basis of the third feature amounts supplied from the third local feature amount calculation unit 323, extends the global feature amount R to the feature amount in units of the second hierarchical group according to the second feature amounts supplied from the second local feature amount calculation unit 322, and outputs the global feature amount R to the second global feature amount calculation unit 362 as the global feature amount R in units of the second hierarchical group.

In step S40, the second global feature amount calculation unit 362 of the global feature amount calculation unit 303 extends the global feature amount R in units of the second hierarchical group supplied from the third global feature amount calculation unit 361 to the feature amount in units of the first hierarchical group according to the first feature amount supplied from the first local feature amount calculation unit 321, and outputs the global feature amount R as the global feature amount R in units of the first hierarchical group to the first global feature amount calculation unit 363.

In step S41, the first global feature amount calculation unit 363 of the global feature amount calculation unit 303 extends the global feature amount R in units of the first hierarchical group supplied from the second global feature amount calculation unit 362 to the feature amount in units of points in the point cloud PC according to the point cloud PC, and outputs the global feature amount R as the global feature amount R in units of points to the recognition unit 304.

In step S42, the recognition unit 304 performs the object recognition processing such as three-dimensional semantic segmentation for each point in the global feature amount R in units of points, and outputs an object recognition result.

In step S43, the object recognition unit 181 determines whether or not an instruction on termination of the processing has been given. In a case where the instruction on the termination has not been given, the processing returns to step S31, and the processing in step S31 and subsequent steps is repeated.

Through the above series of processing, as described with reference to FIGS. 8 to 10, the feature amounts based on sparse sensing results existing within a predetermined distance are grouped with reference to the positions of the feature amounts obtained from the dense sensing result, the feature amounts based on the sensing results having different sparseness and denseness are integrated, and the feature amounts based on the dense sensing result are generated.

As a result, regarding the feature amounts based on the sensing results having different sparseness and denseness, the point cloud PC is restored on the basis of the feature amounts obtained by integrating the feature amounts based on the sparse sensing result having a spatially high correlation with reference to the feature amounts based on the dense sensing result, and can be used for the object recognition processing, so that the recognition accuracy can be improved.

Note that the example in which the recognition unit 304 performs the object recognition by three-dimensional semantic segmentation has been described, but the object recognition may be two-dimensional.

Furthermore, the example of using the feature amounts based on the point cloud that is the sensing result of the LiDAR 102a as the feature amounts based on the dense sensing result, and the feature amounts based on the sensing result of the millimeter wave radar 102b as the feature amounts based on the sparse sensing result has been described.

However, other feature amounts having sensing results having different sparseness and denseness by sensors having different resolutions can be integrated as feature amounts based on a dense sensing result with reference to feature amounts based on whichever denser sensing result.

Furthermore, in the above description, the case of integrating the two feature amounts having different sparseness and denseness has been described. However, even if there are three or more feature amounts, the feature amounts can be integrated by a method similar to the above with reference to the feature amounts based on the densest sensing result.

<Modification of First Embodiment>

In the above description, the example of appropriately integrating the feature amounts having spatially different sparseness and denseness by integrating spatially highly correlated feature amounts has been described. However, not only the feature amounts highly correlated in distance in the spatial direction but also temporally close feature amounts, that is, feature amounts highly correlated in time direction may be integrated.

Figure 12:
FIG. 12 is a diagram for describing a modification of the first embodiment.

That is, as illustrated in the left part of FIG. 12, consider a case in which there are a first sensor that detects a dense sensing result in the time direction that is the right direction in the drawing and a second sensor that detects a sparse sensing result in the time direction, and the feature amounts are integrated.

Note that, in FIG. 12, the sensing result is detected in units of 1/6 seconds in the first sensor, and the sensing result is detected in units of 1 second in the second sensor.

In this case, for example, regarding the feature amounts of the first sensor at time t, as indicated by the arrow in the right part of FIG. 12, the feature amounts of the second sensor in a range of 0.5 seconds before and after the time t, that is, a range from time (t−0.5) to time (t+0.5) may be grouped and integrated.

Furthermore, the feature amounts based on the sparse sensing result within a predetermined distance may be grouped and integrated with the feature amounts based on the dense sensing result not only close in the time direction but also close in the spatial direction, for example, in a spatiotemporal direction set by four-dimensional parameters such as (x, y, z, t). Note that, here, in (x, y, z, t), x, y, and z are coordinates in the spatial direction, and t is a coordinate in the time direction.

Moreover, regarding the integrated feature amount calculation unit 324, the example of integrating the second feature amounts calculated by the second local feature amount calculation unit 322 based on the dense sensing result and the feature amounts based on the sparse sensing result has been described. However, it may be configured to integrate the first feature amounts in the more previous stage with the feature amounts based on the sparse sensing result.

In this case, the density of the feature amounts based on the dense sensing result is higher, and the predetermined distance from the feature amounts based on the dense sensing result to be grouped with is also small. Therefore, the feature amounts based on the sparse sensing result are less likely to be grouped and are more likely to be thinned out. Therefore, there is a high possibility that the feature amounts based on the dense sensing result are dominantly integrated.

Furthermore, the integrated feature amount calculation unit 324 may be configured to integrate the third feature amounts in the more subsequent stage with the feature amounts based on the sparse sensing result.

In this case, the density of the feature amounts based on the dense sensing result is low, and the predetermined distance from the feature amounts based on the dense sensing result to be grouped with is large. Therefore, the feature amounts based on the sparse sensing result are more likely to be grouped. Therefore, there is a high possibility that the feature amounts based on the sparse sensing result are dominantly integrated.

As described above, by changing the position where the integrated feature amount calculation unit 324 is provided, it is possible to change which one of the feature amounts based on the dense sensing result and the feature amounts based on the sparse sensing result are to be dominantly integrated.

Therefore, for example, in a case where the reliability of the feature amounts based on the dense sensing result is high and the reliability of the feature amounts based on the sparse sensing result is low, the integrated feature amount calculation unit 324 is configured to integrate the feature amounts in the more previous stage and the feature amounts based on the sparse sensing result, thereby suppressing a decrease in the reliability of the feature amounts based on the sparse sensing result.

Conversely, for example, in a case where the reliability of the feature amounts based on the dense sensing result is low and the reliability of the feature amounts based on the sparse sensing result is high, the integrated feature amount calculation unit 324 is configured to integrate the feature amounts in the more subsequent stage and the feature amounts based on the sparse sensing result, thereby suppressing a decrease in the reliability of the feature amounts based on the dense sensing result.

3. Second Embodiment

The example in which the integrated feature amount calculation unit 324 integrates the second feature amounts based on the dense sensing results calculated by the second local feature amount calculation unit 322 and the feature amounts based on the sparse sensing results to form the new second feature amounts, and outputs the new second feature amounts to the third local feature amount calculation unit 323 has been described.

However, integration of the feature amounts based on the dense sensing results and the feature amounts based on the sparse sensing results may be performed in multiple stages.

Figure 13:
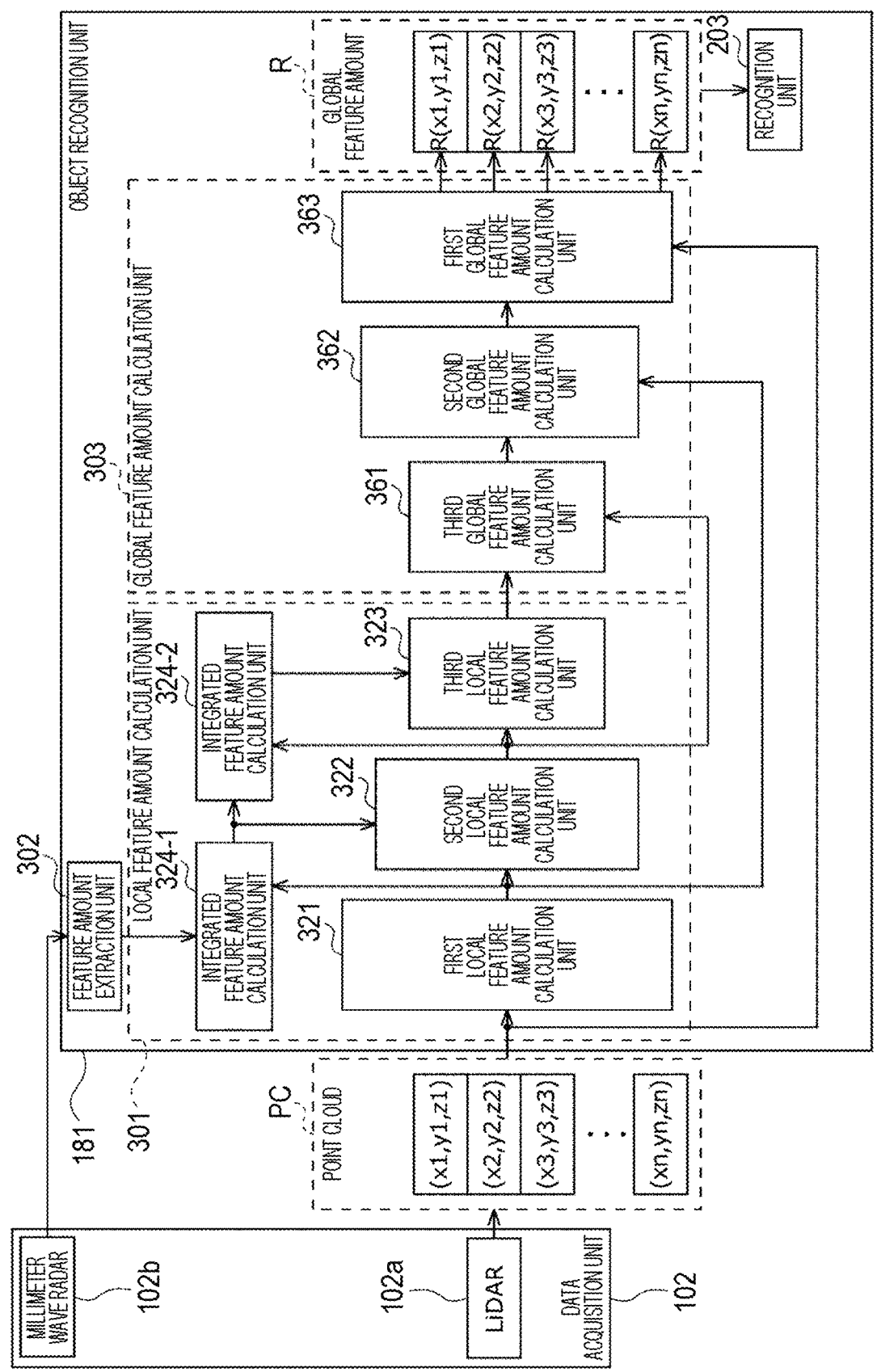
FIG. 13 is a block diagram for describing a configuration example of a second embodiment of an object recognition unit of the present disclosure.

FIG. 13 illustrates a configuration example of an object recognition unit 181 in which feature amounts based on a dense sensing result and feature amounts based on a sparse sensing result are integrated in multiple stages.

Note that, in the object recognition unit 181 in FIG. 13, configurations having the same functions as the configurations in the object recognition unit 181 in FIG. 7 are denoted by the same reference numerals, and description thereof is appropriately omitted.

That is, the object recognition unit 181 in FIG. 13 is different from the object recognition unit 181 in FIG. 7 in that an integrated feature amount calculation unit 324 is configured in multiple stages and is provided as integrated feature amount calculation units 324-1 and 324-2.

Functions of the integrated feature amount calculation units 324-1 and 324-2 are basically the same as those of the integrated feature amount calculation unit 324, but are different in functions due to the multistage configuration.

That is, the integrated feature amount calculation unit 324-1 integrates first feature amounts of dense sensing results supplied from a first local feature amount calculation unit 321 and feature amounts based on sparse sensing results, and outputs the integrated feature amounts as first feature amounts to a second local feature amount calculation unit 322 and the integrated feature amount calculation unit 324-2.

The integrated feature amount calculation unit 324-2 integrates second feature amounts of dense sensing results supplied from the second local feature amount calculation unit 322 and the first feature amounts in which the sensing results having different sparseness and denseness are integrated supplied from the integrated feature amount calculation unit 324-1, and outputs the integrated feature amounts as second feature amounts to a third local feature amount calculation unit 323.

Note that the integrated feature amount calculation units 324-1 and 324-2 respectively include corresponding measurement information calculation units 331-1 and 331-2, integration tables 332-1 and 332-2, selection units 333-1, 333-2, and integration units 334-1 and 334-2, which have basically the same functions as the corresponding measurement information calculation unit 331, the integration table 332, the selection unit 333, and the integration unit 334 described with reference to FIG. 10.

The first feature amounts, second feature amounts, and third feature amounts are gradually sparse, but feature amounts of high importance are left as remaining feature amounts.

By integrating the feature amounts having different sparseness and denseness in multiple stages, the feature amounts having high spatial (spatiotemporal) correlation are repeatedly integrated with respect to the feature amounts having high importance even in the case of the feature amounts based on sparse sensing results such as a millimeter wave radar 102*b*, and thus, it is possible to enhance the accuracy of a global feature amount R to be finally obtained.

As a result, it is possible to implement object recognition processing such as semantic segmentation using the global feature amount R with high accuracy (with a large amount of information), and to improve recognition accuracy.

<Object Recognition Processing in Second Embodiment>

Figure 14:
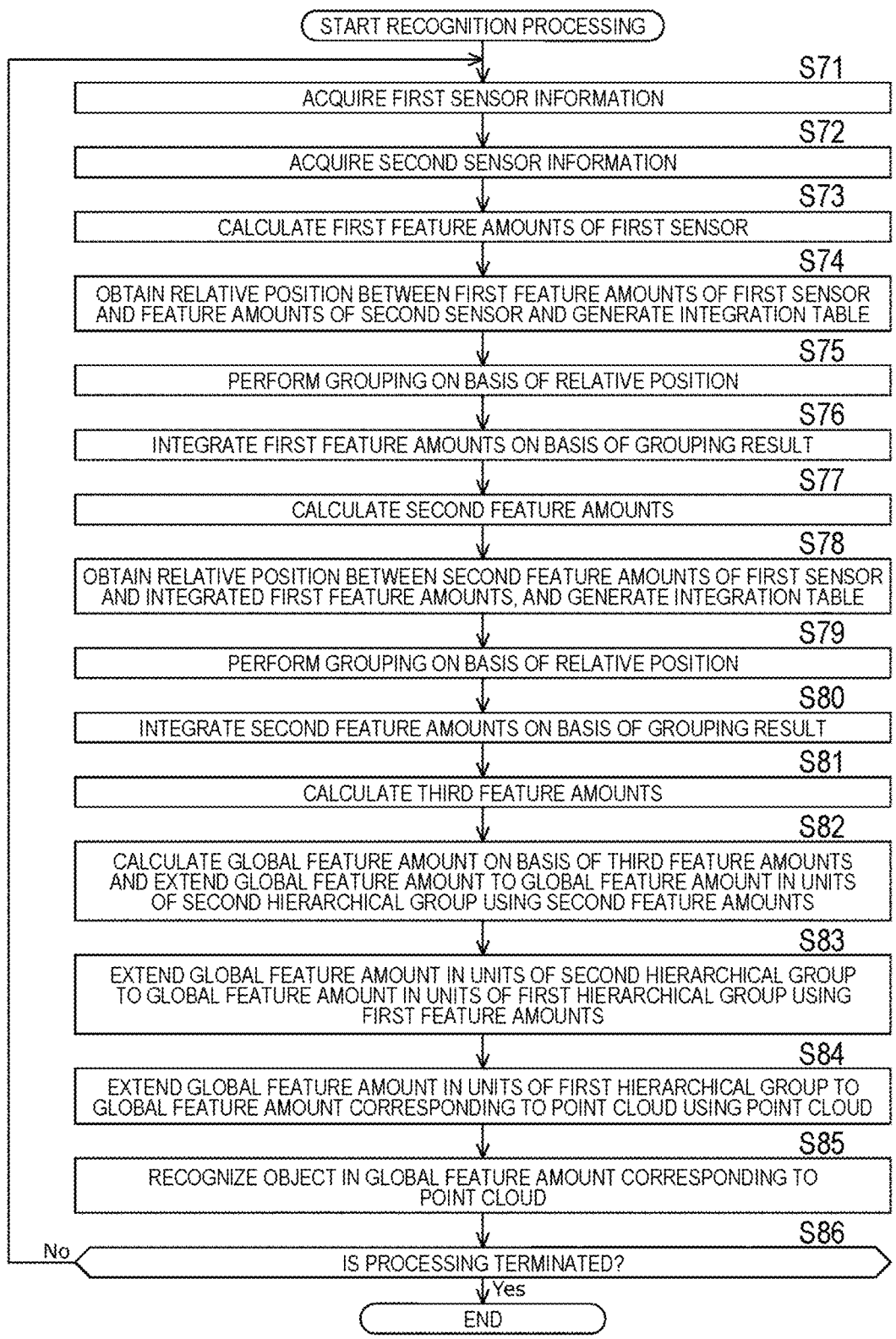
FIG. 14 is a flowchart for describing the object recognition processing of the second embodiment.

Next, the object recognition processing by the object recognition unit 181 in FIG. 13 according to the second embodiment will be described with reference to the flowchart in FIG. 14.

In step S71, the first local feature amount calculation unit 321 of a local feature amount calculation unit 301 acquires point cloud PC that is the dense sensing result obtained by a first sensor including a LiDAR 102*a* supplied from a data acquisition unit 102. At this time, the first global feature amount calculation unit 363 of the global feature amount calculation unit 303 also acquires the point cloud PC that is the dense sensing result obtained by the LiDAR 102*a* supplied from the data acquisition unit 102.

In step S72, a feature amount extraction unit 302 acquires the sparse sensing result obtained by a second sensor including the millimeter wave radar 102*b* supplied from the data acquisition unit 102, extracts the feature amounts, and outputs the feature amounts to the integrated feature amount calculation unit 324-1.

In step S73, the first local feature amount calculation unit 321 calculates the first feature amounts that are the feature amounts in units of a first hierarchical group from the point cloud PC, and outputs the first feature amounts to the second local feature amount calculation unit 322, the integrated feature amount calculation unit 324-1, and a second global feature amount calculation unit 362 of the global feature amount calculation unit 303.

In step S74, the integrated feature amount calculation unit 324-1 causes the corresponding measurement information calculation unit 331-1 to calculate the relative position between the feature amounts based on the sparse sensing result of the millimeter wave radar 102b as the sensing result of the second sensor with the position of the first feature amounts based on the point cloud PC that is the dense sensing result of the LiDAR 102a as the first sensor, and generate the integration table 332-1.

In step S75, the integrated feature amount calculation unit 324-1 controls the selection unit 333-1 to group the feature amounts based on the sparse sensing result existing within a predetermined distance with reference to the first feature amounts based on the dense sensing result on the basis of the relative position information of the integration table 332-1, and causes the integration unit 334-1 to output the feature amounts as the selection result.

In step S76, the integrated feature amount calculation unit 324-1 controls the integration unit 334-1 to integrate the grouped feature amounts based on the sparse sensing result of the second sensor including the millimeter wave radar 102b, for each first feature amount based on the dense sensing result of the first sensor including the LiDAR 102a, on the basis of the selection result, and outputs the integrated feature amounts as the first feature amounts of the first hierarchical group to the second local feature amount calculation unit 322 and the integrated feature amount calculation unit 324-1.

In step S77, the second local feature amount calculation unit 322 acquires the first feature amounts supplied from the integrated feature amount calculation unit 324-1, calculates the second feature amounts that are the feature amounts in units of a second hierarchical group from the first feature amounts, and outputs the second feature amounts to the third local feature amount calculation unit 323, the integrated feature amount calculation unit 324-2, and the first global feature amount calculation unit 363 of the global feature amount calculation unit 303.

In step S78, the integrated feature amount calculation unit 324-2 causes the corresponding measurement information calculation unit 331-2 to calculate a relative position between the feature amounts supplied from the integrated feature amount calculation unit 324-1 with the position of the second feature amounts supplied from the second local feature amount calculation unit 322, and generate the integration table 332-2.

In step S79, the integrated feature amount calculation unit 324-2 controls the selection unit 333-2 to group the feature amounts supplied from the integrated feature amount calculation unit 324-1 existing within a predetermined distance with reference to the second feature amounts based on the dense sensing result on the basis of the relative position information of the integration table 332-2, and causes the integration unit 334-2 to output the feature amounts as the selection result.

In step S80, the integrated feature amount calculation unit 324-2 controls the integration unit 334-2 to integrate the grouped feature amounts supplied from the integrated feature amount calculation unit 324-1 for each second feature amount supplied from the second local feature amount calculation unit 322 on the basis of the selection result, and outputs the integrated feature amounts to the third local feature amount calculation unit 323 as the second feature amounts that are the feature amounts of the second hierarchical group.

In step S81, the third local feature amount calculation unit 323 acquires the second feature amounts supplied from the integrated feature amount calculation unit 324-2. Then, the third local feature amount calculation unit 323 calculates the third feature amounts that are feature amounts in units of the third hierarchical group from the acquired second feature amounts, and outputs the third feature amounts to the third global feature amount calculation unit 361 of the global feature amount calculation unit 303.

In step S82, the third global feature amount calculation unit 361 of the global feature amount calculation unit 303 calculates the global feature amount R in units of the third hierarchical group on the basis of the third feature amounts supplied from the third local feature amount calculation unit 323, extends the global feature amount R to the feature amount in units of the second hierarchical group according to the second feature amounts supplied from the second local feature amount calculation unit 322, and outputs the global feature amount R to the second global feature amount calculation unit 362 as the global feature amount R in units of the second hierarchical group.

In step S83, the second global feature amount calculation unit 362 of the global feature amount calculation unit 303 extends the global feature amount R in units of the second hierarchical group supplied from the third global feature amount calculation unit 361 to the feature amount in units of the first hierarchical group according to the first feature amount supplied from the first local feature amount calculation unit 321, and outputs the global feature amount R as the global feature amount R in units of the first hierarchical group to the first global feature amount calculation unit 363.

In step S84, the first global feature amount calculation unit 363 of the global feature amount calculation unit 303 extends the global feature amount R in units of the first hierarchical group supplied from the second global feature amount calculation unit 362 to the feature amount in units of points in the point cloud PC according to the point cloud PC, and outputs the global feature amount R as the global feature amount R in units of points to a recognition unit 304.

In step S85, the recognition unit 304 performs the object recognition processing such as semantic segmentation for each point in the global feature amount R in units of points, and outputs an object recognition result.

In step S86, the object recognition unit 181 determines whether or not an instruction on termination of the processing has been given. In a case where the instruction on the termination has not been given, the processing returns to step S71, and the processing in step S71 and subsequent steps is repeated.

Through the above series of processing, by integrating the feature amounts having different sparseness and denseness in multiple stages, the feature amounts having high spatial (spatiotemporal) correlation are repeatedly integrated with respect to the feature amounts having high importance even in the case of the feature amounts based on sparse sensing results such as a millimeter wave radar 102*b*, and thus, it is possible to enhance the accuracy of a global feature amount R to be finally obtained.

As a result, the feature amounts based on the sensing results having different sparseness and denseness are integrated with the feature amounts based on the sparse sensing result having a high spatial (spatiotemporal) correlation with reference to the feature amounts based on the dense sensing result and can be used for the object recognition processing. Therefore, the recognition accuracy can be improved.

As a result, it is possible to implement object recognition processing such as semantic segmentation using the global feature amount R with high accuracy, and to improve recognition accuracy.

4. Example of Executed by Software

By the way, the above-described series of processing can be executed by hardware or software. In a case where the series of processing is executed by software, a program constituting the software is installed from a recording medium into a computer incorporated in special hardware, a general-purpose computer capable of executing various functions by installing various programs, or the like.

FIG. 15 illustrates a configuration example of a general-purpose computer. The personal computer incorporates a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, an input unit 1006 including an input device such as a keyboard and a mouse for a user to input operation commands, an output unit 1007 that outputs a processing operation screen and an image of a processing result to a display device, a storage unit 1008 including a hard disk drive for storing programs and various data, and a communication unit 1009 including a local area network (LAN) adapter and the like and which executes communication processing via a network typified by the Internet are connected. Furthermore, a drive 1010 that reads and writes data with respect to a removable storage medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory is connected to the input/output interface 1005.

The CPU 1001 executes various types of processing according to a program stored in the ROM 1002 or a program read from the removable storage medium 1011 such as a magnetic disk, an optical disk, a magneto-optical disk, or a semiconductor memory, installed in the storage unit 1008, and loaded from the storage unit 1008 to the RAM 1003. Furthermore, the RAM 1003 appropriately stores data and the like necessary for the CPU 1001 to execute the various types of processing.

In the computer configured as described above, the CPU 1001, for example, loads the program stored in the storage unit 1008 into the RAM 1003 and executes the program via the input/output interface 1005 and the bus 1004, whereby the above-described series of processing is performed.

The program to be executed by the computer (CPU 1001) can be recorded on the removable storage medium 1011 as a package medium or the like, for example, and provided. Furthermore, the program can be provided via a wired or wireless transmission medium such as a local area network, the Internet, or digital satellite broadcast.

In the computer, the program can be installed to the storage unit 1008 via the input/output interface 1005 by attaching the removable storage medium 1011 to the drive 1010. Furthermore, the program can be received by the communication unit 1009 via a wired or wireless transmission medium and installed in the storage unit 1008. Other than the above method, the program can be installed in the ROM 1002 or the storage unit 1008 in advance.

Note that the program executed by the computer may be a program processed in chronological order according to the order described in the present specification or may be a program executed in parallel or at necessary timing such as when a call is made.

Note that the CPU 1001 in FIG. 15 implements the function of the object recognition unit 181 in FIGS. 7 and 13.

Furthermore, in the present specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one housing are both systems.

Note that the embodiments of the present disclosure are not limited to the above-described embodiments, and various modifications can be made without departing from the gist of the present disclosure.

For example, the present disclosure can adopt a configuration of cloud computing in which one function is shared and processed in cooperation by a plurality of devices via a network.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can have the following configurations.

<1> An information processing device including:
a first acquisition unit configured to acquire a first feature amount that is a feature amount of a detection point detected by a first sensor;
a second acquisition unit configured to acquire a second feature amount that is a feature amount of a detection point detected by a second sensor; and
an integrated feature amount calculation unit configured to calculate an integrated feature amount obtained by integrating the first feature amount and the second feature amount on the basis of a relative distance between the respective detection points of the first feature amount and the second feature amount.

<2> The information processing device according to <1>, in which
the integrated feature amount calculation unit
further includes a corresponding measurement information calculation unit configured to calculate a relative position between the detection point of the first feature amount and the detection point of the second feature amount as corresponding measurement information, and
calculates the relative distance between the respective detection points of the first feature amount and the second feature amount on the basis of information of the relative position, and calculates the integrated feature amount obtained by integrating the first feature amount and the second feature amount on the basis of the calculated distance.

<3> The information processing device according to <2>, in which the corresponding measurement information calculation unit calculates the relative position between the detection point of the first feature amount and the detection point of the second feature amount as the corresponding measurement information, and generates an integration table in which the first feature amount and the second feature amount are associated with each other, and the integrated feature amount calculation unit calculates the relative distance between the respective detection points of the first feature amount and the second feature amount on the basis of the integration table, and calculates the integrated feature amount obtained by integrating the first feature amount and the second feature amount on the basis of the calculated distance.

<4> The information processing device according to <3>, in which the integrated feature amount calculation unit further includes a selection unit configured to calculate the relative distance between the respective detection points of the first feature amount and the second feature amount on the basis of the integration table, and select the second feature amount within a predetermined distance as a feature amount to be grouped, for each of the first feature amounts, from among the second feature amounts, and calculates the integrated feature amount obtained by integrating the second feature amount selected as the feature amount to be grouped as the second feature amount within the predetermined distance, for each of the first feature amounts, by the selection unit, and the first feature amount.

<5> The information processing device according to <4>, in which the integrated feature amount calculation unit further includes an integration unit configured to calculate the integrated feature amount obtained by integrating the second feature amount selected as the feature amount to be grouped as the second feature amount within the predetermined distance, for each of the first feature amounts, by the selection unit, and the first feature amount, and outputs the integrated feature amount calculated by the integration unit.

<6> The information processing device according to any one of <1> to <5>, including:

a plurality of the integrated feature amount calculation units.

<7> The information processing device according to any one of <1> to <5>, in which the first sensor and the second sensor have different resolutions.

<8> The information processing device according to <7>, in which the first feature amount and the second feature amount have different sparseness and denseness.

<9> The information processing device according to <7>, in which the resolution of the first sensor is higher than the resolution of the second sensor.

<10> The information processing device according to <9>, in which the first feature amount is denser than the second feature amount.

<11> The information processing device according to <7>, in which the first sensor is a LiDAR, and the second sensor is a millimeter wave radar.

<12> The information processing device according to any one of <1> to <11>, in which the distance is a spatial distance.

<13> The information processing device according to any one of <1> to <11>, in which the distance is a temporal distance.

<14> The information processing device according to any one of <1> to <11>, in which the distance is a distance obtained by combining both a spatial distance and a temporal distance.

<15> The information processing device according to any one of <1> to <14>, further including:

a local feature amount calculation unit configured to sample the integrated feature amount such that each spatial distance becomes longer, group the sampled integrated feature amount and another integrated feature amount within a spatially predetermined distance, integrate the sampled integrated feature amount and the grouped integrated feature amount, and calculate a local feature amount.

<16> The information processing device according to <15>, further including:

a global feature amount calculation unit configured to restore a feature amount corresponding to the integrated feature amount that has been lost due to the integration of the sampled integrated feature amount and the grouped integrated feature amount by the local feature amount calculation unit, on the basis of the local feature amount, and calculate the restored feature amount as a global feature amount.

<17> The information processing device according to <16>, in which the local feature amount calculation unit and the global feature amount calculation unit form a Point-Net++ structure.

<18> An information processing method of an information processing device including a first acquisition unit, a second acquisition unit, and an integrated feature amount calculation unit, the information processing method including the steps of:

by first acquisition unit, acquiring a first feature amount that is a feature amount of a detection point detected by a first sensor;

by the second acquisition unit, acquiring a second feature amount that is a feature amount of a detection point detected by a second sensor; and by the integrated feature amount calculation unit, calculating an integrated feature amount obtained by integrating the first feature amount and the second feature amount on the basis of a relative distance between the respective detection points of the first feature amount and the second feature amount.

<19> A program for causing a computer to function as:

a first acquisition unit configured to acquire a first feature amount that is a feature amount of a detection point detected by a first sensor;

a second acquisition unit configured to acquire a second feature amount that is a feature amount of a detection point detected by a second sensor; and an integrated feature amount calculation unit configured to calculate an integrated feature amount obtained by integrating the first feature amount and the second feature amount on the basis of a relative distance between the respective detection points of the first feature amount and the second feature amount.

REFERENCE SIGNS LIST

11 Object recognition unit
12-1, 12-2 Sensor
21 Integration processing unit
22 Restoration unit
23 Semantic segmentation unit
51 Vehicle
141 Vehicle exterior information detection unit
181 Object recognition unit
182 Vehicle detection unit
301 Local feature amount calculation unit
302 Feature amount extraction unit
303 Global feature amount calculation unit
304 Recognition unit
321 First local feature amount calculation unit
322 Second local feature amount calculation unit
323 Third local feature amount calculation unit
324, 324-1, 324-2 Integrated feature amount calculation unit
331, 331-1, 331-2 Corresponding measurement information calculation unit
332, 332-1, 332-2 Integration table
333, 333-1, 333-2 Selection unit
334, 334-1, 334-2 Integration unit
361 Third global feature amount calculation unit
362 Second global feature amount calculation unit
363 First global feature amount calculation unit

The invention claimed is:

1. An information processing device comprising:
a first acquisition unit configured to acquire a first feature amount that is a feature amount of a detection point detected by a first sensor;
a second acquisition unit configured to acquire a second feature amount that is a feature amount of a detection point detected by a second sensor; and
an integrated feature amount calculation unit configured to calculate an integrated feature amount obtained by integrating the first feature amount and the second feature amount on a basis of a relative distance between the respective detection points of the first feature amount and the second feature amount, wherein the integrated feature amount calculation unit further includes a corresponding measurement information calculation unit configured to calculate a relative position between the detection point of the first feature amount and the detection point of the second feature amount as corresponding measurement information, calculates the relative distance between the respective detection points of the first feature amount and the second feature amount on a basis of information of the relative position, and
calculates the integrated feature amount obtained by integrating the first feature amount and the second feature amount on a basis of the calculated distance.

2. The information processing device according to claim 1, wherein
the corresponding measurement information calculation unit calculates the relative position between the detection point of the first feature amount and the detection point of the second feature amount as the corresponding measurement information, and generates an integration table in which
the first feature amount and the second feature amount are associated with each other, and the integrated feature amount calculation unit calculates the relative distance between the respective detection points of the first feature amount and the second feature amount on a basis of the integration table, and calculates the integrated feature amount obtained by integrating the first feature amount and the second feature amount on a basis of the calculated distance.

3. The information processing device according to claim 2, wherein
the integrated feature amount calculation unit further includes a selection unit configured to calculate the relative distance between the respective detection points of the first feature amount and the second feature amount on a basis of the integration table, and select the second feature amount within a predetermined distance as a feature amount to be grouped, for each of the first feature amounts, from among the second feature amounts, and calculates the integrated feature amount obtained by integrating the second feature amount selected as the feature amount to be grouped as the second feature amount within the predetermined distance, for each of the first feature amounts, by the selection unit, and the first feature amount.

4. The information processing device according to claim 3, wherein
the integrated feature amount calculation unit further includes an integration unit configured to calculate the integrated feature amount obtained by integrating the second feature amount selected as the feature amount to be grouped as the second feature amount within the predetermined distance, for each of the first feature amounts, by the selection unit, and the first feature amount, and outputs the integrated feature amount calculated by the integration unit.

5. The information processing device according to claim 1, comprising:
a plurality of the integrated feature amount calculation units.

6. The information processing device according to claim 1, wherein
the first sensor and the second sensor have different resolutions.

7. The information processing device according to claim 6, wherein
the first feature amount and the second feature amount have different sparseness and denseness.

8. The information processing device according to claim 6, wherein
the resolution of the first sensor is higher than the resolution of the second sensor.

9. The information processing device according to claim 8, wherein the first feature amount is denser than the second feature amount.

10. The information processing device according to claim 6, wherein
the first sensor is a LiDAR, and the second sensor is a millimeter wave radar.

11. The information processing device according to claim 1, wherein
the distance is a spatial distance.

12. The information processing device according to claim 1, wherein
the distance is a temporal distance.

13. The information processing device according to claim 1, wherein
the distance is a distance obtained by combining both a spatial distance and a temporal distance.

14. The information processing device according to claim 1, further comprising:
a local feature amount calculation unit configured to sample the integrated feature amount such that each spatial distance becomes longer, group the sampled integrated feature amount and another integrated feature amount within a spatially predetermined distance, integrate the sampled integrated feature amount and the grouped integrated feature amount, and calculate a local feature amount.

15. The information processing device according to claim 14, further comprising:
a global feature amount calculation unit configured to restore a feature amount corresponding to the integrated feature amount that has been lost due to the integration of the sampled integrated feature amount and the grouped integrated feature amount by the local feature amount calculation unit, on a basis of the local feature amount, and calculate the restored feature amount as a global feature amount.

16. The information processing device according to claim 15, wherein
the local feature amount calculation unit and the global feature amount calculation unit form a PointNet++ structure.

17. An information processing method of an information processing device including a first acquisition unit, a second acquisition unit, and an integrated feature amount calculation unit, the information processing method comprising the steps of:
by first acquisition unit, acquiring a first feature amount that is a feature amount of a detection point detected by a first sensor;
by the second acquisition unit, acquiring a second feature amount that is a feature amount of a detection point detected by a second sensor; and
by the integrated feature amount calculation unit, calculating an integrated feature amount obtained by integrating the first feature amount and the second feature amount on a basis of a relative distance between the respective detection points of the first feature amount and the second feature amount, calculating a relative position between the detection point of the first feature amount and the detection point of the second feature amount as corresponding measurement information, calculating the relative distance between the respective detection points of the first feature amount and the second feature amount on a basis of information of the relative position, and calculating the integrated feature amount obtained by integrating the first feature amount and the second feature amount on a basis of the calculated distance.

18. A non-transitory computer-readable storage medium storing a program that, when processed by a processor of a computer, causes the computer to function as:
a first acquisition unit configured to acquire a first feature amount that is a feature amount of a detection point detected by a first sensor;
a second acquisition unit configured to acquire a second feature amount that is a feature amount of a detection point detected by a second sensor; and
an integrated feature amount calculation unit configured to calculate an integrated feature amount obtained by integrating the first feature amount and the second feature amount on a basis of a relative distance between the respective detection points of the first feature amount and the second feature amount, wherein the integrated feature amount calculation unit
further includes a corresponding measurement information calculation unit configured to calculate a relative position between the detection point of the first feature amount and the detection point of the second feature amount as corresponding measurement information,
calculates the relative distance between the respective detection points of the first feature amount and the second feature amount on a basis of information of the relative position, and
calculates the integrated feature amount obtained by integrating the first feature amount and the second feature amount on a basis of the calculated distance.

* * * * *